US012338994B2

(12) United States Patent
Spiros

(10) Patent No.: US 12,338,994 B2
(45) Date of Patent: Jun. 24, 2025

(54) APPARATUS, SYSTEM AND METHOD FOR PYROLYSING AND COMBUSTING A MATERIAL

(71) Applicant: ECO-GLOBAL ENERGY PTY LIMITED, Sylvania (AU)

(72) Inventor: Spiro Spiros, Mascot (AU)

(73) Assignee: ECO-GLOBAL ENERGY PTY LIMITED, Sylvania (AU)

( * ) Notice: Subject to any disclaimer, the term of this patent is extended or adjusted under 35 U.S.C. 154(b) by 685 days.

(21) Appl. No.: 17/623,003

(22) PCT Filed: Jun. 26, 2020

(86) PCT No.: PCT/AU2020/050663
§ 371 (c)(1),
(2) Date: Dec. 27, 2021

(87) PCT Pub. No.: WO2020/257872
PCT Pub. Date: Dec. 30, 2020

(65) Prior Publication Data
US 2022/0252260 A1    Aug. 11, 2022

(30) Foreign Application Priority Data
Jun. 28, 2019  (AU) ................................ 2019902278

(51) Int. Cl.
*F23G 7/06* (2006.01)
*B01J 6/00* (2006.01)
(Continued)

(52) U.S. Cl.
CPC .............. *F23G 7/066* (2013.01); *B01J 6/008* (2013.01); *C10G 1/10* (2013.01); *C10J 3/82* (2013.01);
(Continued)

(58) Field of Classification Search
CPC ...... F23G 5/027; F23G 5/0273; F23G 5/0276; F23G 5/14; F23G 5/16; F23G 5/165;
(Continued)

(56) References Cited

U.S. PATENT DOCUMENTS 5,310,334 A * 5/1994 Spiros ..................... F23D 14/32
110/215
5,366,699 A  11/1994  Milfeld et al.
(Continued)

FOREIGN PATENT DOCUMENTS

CN       109780548 A     5/2019
KR    10-2011-0138928 A  12/2011
(Continued)

OTHER PUBLICATIONS

International Search Report and Written Opinion issued by the Australian Patent Office acting as International Searching Authority for International Patent Application No. PCT/AU2020/050663 dated Sep. 1, 2020 (17 total pages).

*Primary Examiner* — David J Laux
(74) *Attorney, Agent, or Firm* — Dinsmore & Shohl LLP

(57) ABSTRACT

Described herein is an apparatus (10), system (300) and method for pyrolysing and combusting a material. One described embodiment provides an apparatus (10) comprising one or more crucibles (50, 51) for receiving a material to be pyrolysed and combusted therein and one or more heating tubes (100-210) disposed in proximity to the crucible(s) (50, 51). The or each heating tube (100-210) is configured for receiving byproduct(s) produced during pyrolysis and combustion of the material within the crucible(s) (50, 51) and pyrolising and combusting the byproduct(s) to produce flue gas from the byproduct(s). The flue gas produced within the heating tube(s) (100-210) are mixed with a hydroxy gas.

19 Claims, 14 Drawing Sheets

(51) Int. Cl.
  *C10G 1/10*  (2006.01)
  *C10J 3/82*  (2006.01)
  *C25B 1/04*  (2021.01)
  *F23Q 3/00*  (2006.01)

(52) U.S. Cl.
  CPC ..... *F23Q 3/008* (2013.01); *C10G 2300/1003* (2013.01); *C25B 1/04* (2013.01); *F23G 2201/30* (2013.01); *F23G 2201/303* (2013.01)

(58) Field of Classification Search
  CPC ......... F23G 2201/303; F23G 2202/102; F23G 2202/103; F23G 2900/50204
  See application file for complete search history.

(56) References Cited

U.S. PATENT DOCUMENTS

| | | |
|---|---|---|
| 2004/0013988 A1 | 1/2004 | Kim |
| 2006/0032419 A1 | 2/2006 | Hyun |

FOREIGN PATENT DOCUMENTS

| | | | |
|---|---|---|---|
| KR | 10-2012-0134510 A1 | 12/2012 | |
| KR | 101532508 B1 | 6/2015 | |
| KR | 10-2018-0012479 A | 2/2018 | |
| WO | 1995/007373 A1 | 3/1995 | |
| WO | 2008/033107 A2 | 3/2008 | |

\* cited by examiner

APPARATUS, SYSTEM AND METHOD FOR PYROLYSING AND COMBUSTING A MATERIAL

CROSS-REFERENCE TO RELATED APPLICATIONS

This application is a U.S. National Phase of PCT/AU2020/050663, entitled "AN APPARATUS, SYSTEM AND METHOD FOR PYROLYSING AND COMBUSTING A MATERIAL" and filed Jun. 26, 2020, which claims priority to Australian Application No. 2019902278 entitled "An apparatus, system and method for pyrolyzing a material", filed Jun. 28, 2019, each of which is incorporated herein by reference in its respective entirety.

TECHNICAL FIELD

The present invention relates to an apparatus, system, and method for pyrolysing a material.

The invention has been developed primarily for use in pyrolysing and combustion, waste material, in particular, hydrocarbon-containing waste material for the production of electricity and other commodities or coal for the production of electricity or natural gas or silica and calcium carbonate and coal for the manufacture of cement. These inputs yield flue gases comprising products that can be used as commodities to offset the associated costs of the pyrolysis method with combustion, while the remainder of the flue gases is rendered carbon neutral for the environmentally safe disposal thereof, and will be described hereinafter with reference to this application. However it will be appreciated that the invention is applicable in broader contexts.

The following discussion of the background to the invention is intended to facilitate an understanding of the invention. However, it should be appreciated that the discussion is not an acknowledgement or admission that any of the material referred to was published, known or part of the common general knowledge in Australia or any other country as at the priority date of any one of the claims of this specification.

BACKGROUND OF INVENTION

The disposal of hydrocarbon-containing waste material HC, is fraught with many problems, conventional methods of disposing $CO_2$, CO and all hydrocarbons of such waste material typically involve either burning the waste material in a furnace or burying it in a landfill site. In either case, the waste material degrades, resulting in the formation of highly toxic compounds that pollute the environment. Such pollutants often leach into the groundwater, the atmosphere and ultimately lead to the contamination of the food chain.

Coal/Natural Gas: The disposal of hydrocarbons and toxins given by coal fire power stations or gas fired power stations is also problematic. In conventional methods the disposal of $CO_2$, CO and toxins in coal or gas typically involves burning the coal or natural gas in a furnace or turbine to generate electricity. Regarding coal, roughly half the ash is recycled, and the other half is placed in landfill sites. Toxins from the landfill ash are released in the environment. Such pollutants often leach into the groundwater, the atmosphere and ultimately leading to contamination of the food chain. Regarding electricity production from natural gas, toxins are released into the atmosphere, such us CO and $CO_2$.

Cement: The disposal of the hydrocarbons from coal generated in the manufacturing of cement also comes with many problems. In conventional methods for the disposal of $CO_2$, CO and toxins in cement manufacturing involves burning the coal in a furnace to manufacture cement. Half the ash is recycled and the other is placed in land sites, leading to toxin and pollutant release problems as mentioned above.

The present invention seeks to provide an apparatus, system and method for pyrolysing with combustion, a material such as waste material, coal, natural gas, silica and/or calcium carbonate. This process may provide for the manufacture of cement. This methodology will overcome or substantially improve at the majority of the deficiencies of the prior art, or to at least provide an alternative.

SUMMARY OF INVENTION

According to a first aspect of the present invention there is provided an apparatus for pyrolysing and combusting a material, the apparatus comprising:
one or more crucibles for receiving a material to be pyrolysed and combusted therein; and
one or more heating tubes disposed in proximity to the crucible(s), wherein the or each heating tube is configured for receiving byproduct(s) produced during pyrolysis and combustion of the material within the crucible(s) and pyrolising and combusting the byproduct(s) to produce flue gas from the byproduct(s), wherein the flue gas produced within said heating tube(s) are mixed with a hydroxy gas.

The pyrolised gases from the pyrolysis crucible(s) are mixed and injected into the heating tubes in the presence of hydroxy gas for pyrolysis and combustion. The methodology and design for the treatment of natural gas requires an apparatus that does not require crucibles.

Preferably, the material received within the crucible is pyrolysed and combusted using the heat generated within the or each heating tube during pyrolysis and combustion of the byproduct by the heating tubes.

For the manufacture of cement utilising our method and our apparatus for pyrolysis and combustion of a material, we require two crucibles, a crucible with around 10% silica and around 70% calcium carbonate and a separate crucible with around 20% coal to make one tonne of cement. No emissions of CO and $CO_2$ are releases into the atmosphere utilising our methodology.

Preferably, the gas is oxyhydrogen, which is hydroxy gas. However, in other embodiments, other types of gas may be used.

Preferably, the apparatus further comprises an electronic ignition device. The electronic ignition device may include a high voltage and high temperature spark plug, or glow plug but not excluding other designs. The electronic ignition device may be electrically connected to the or each heating tube to ignite the gas within said heating tube. In addition, a mechanical device is incorporated at the appropriate distance from the output of the injectors of the mixing cavity, required for the replacement of the electronic ignition device because of the carbon build-up over time or ultrasonic removal of the carbon black.

In some embodiments, the electronic ignition device includes:
a plurality of spark plugs to ignite the hydroxy gas within the or each heating tube; and
a mechanised delivery system for delivering replacement spark plugs when a carbon build up occurs.

The mechanised delivery system may include a magazine of replacement spark plugs. The mechanised delivery system may include an ultrasonic cleaning device for cleaning dirty spark plugs.

Preferably, the or each heating tube is adapted to generate and/or support temperatures across the range of 0 degrees Celsius to 3,000 degrees Celsius during pyrolysis and combustion of the byproduct(s). Preferably, the temperature generated within the or each heating tube during pyrolysis and combustion of the by-product(s) is up to 3,000 degrees Celsius. This is caused by the mixture of the hydroxy gas and the by-products being pyrolysed and combusted. The hydroxy gas does not have the capacity to melt tungsten but make it white hot. The melting point of tungsten is 3,422 degrees and the boiling point is 5,555 degrees. The temperatures are kept in a controlled environment within the heating tubes up to 3000 degrees Celsius. In some embodiments, the heating tubes may be adapted to support pyrolysis and combustion in ranges such as 1000 to 1500 degrees Celsius, 1500-2000 degrees Celsius, 2000-2500 degrees Celsius, 2500-2750 degrees Celsius, 2750-3000 degrees Celsius, 3000-3200 degrees Celsius or any range or sub range therebetween.

Preferably, the temperature generated within the chamber and the crucible can extend up to 3,000 degrees Celsius. In some embodiments, the crucibles may be adapted to support pyrolysis and combustion in ranges such as 1000 to 1500 degrees Celsius, 1500-2000 degrees Celsius, 2000-2500 degrees Celsius, 2500-2750 degrees Celsius, 2750-3000 degrees Celsius, 3000-3200 degrees Celsius or any range or sub range therebetween.

Preferably, the apparatus further comprises a housing with an opening configured to receive and mount the agitating crucible there within the cavity/chamber.

Preferably, the or each heating tube is mounted within a housing cavity of the housing. Suitably, the or each heating tube is mounted within the internal and external wall of the housing. The outside wall of the housing, the lid and the seals on the internal wall of the housing. In some embodiments, the chamber includes refractory brick insulation to maintain the heat internally.

In one embodiment, the one or more heating tubes comprise a plurality of heating tubes mounted within the housing. Preferably, the apparatus comprises an array of heating tubes disposed around the one or more crucibles Preferably, the heating tubes are spaced apart arranged around the perimeter of the crucible. The heating tubes may be configured in multiple arrays and placed within housing cavity. In some embodiments, the one or more heating tubes comprise a plurality of heating tubes mounted within the housing and disposed in spaced apart arrangement within the housing around a chamber conducting the heat to the crucible.

Preferably, the apparatus further comprises a lid that is configured to seal, to engage the opening of the housing, to enclose the chamber. The lid preferably seals the chamber and the crucible. Preferably, there is a clearance between the crucible and the lid so that the crucible can be agitated within the chamber.

Preferably, the apparatus further comprises a conduit that extends substantially through the lid. The conduit may also extend through the refractory brick work insulation and the opening of the chamber. Preferably, each heating tube has a corresponding mixing cavity. The gases are mixed with hydroxy gas and are injected into the heating tubes via injectors. The number of heating tubes is not restricted by this design. The number of injectors in the system is preferably the same number of heating tubes in the system.

In some embodiments, the conduit comprises one or more holes to allow gases to escape upwards.

Preferably, the apparatus further comprises a conduit to facilitate the flow of gases and vaporised hydrocarbons to the mixing cavities of the heating tubes. In some embodiments, the apparatus further comprises an overflow reservoir in communication with the conduit to regulate the flow of flue gases from the crucible. Any overflow liquids and gases may redirected via PLC ultrasonic control flow meters/sensor to the reservoir with electrical vaporiser, via the conduit. This redirection facilitates overflow when necessary to one or more of the mixing cavities. If no overflow, the gases go directly to all the mixing cavities. The number of heating tubes is not restricted by this design.

Preferably, the apparatus further comprises a magnetic drive mechanism that is configured to agitate the crucible. Preferably the magnetic drive mechanism is located within the housing.

In one embodiment, the or each heating tube is manufactured from tungsten or tungsten-molybdenum alloy, or a graphite tungsten or aluminium alloy or ceramic tungsten or any other tungsten compound for high temperature application, up to 3000 degrees Celsius.

In one embodiment, the material processed by the system is a hydrocarbon containing material or coal or natural gas and all waste material or silica and calcium carbonate for the manufacture of cement.

In one embodiment the material processed by the system is waste material, or coal or natural gas or silica and calcium carbonate with coal for the manufacture of cement.

Preferably, the hydrocarbon containing material is selected from the group consisting of biomass, natural or synthetic rubber-based products, natural gas, town gas, domestic waste, medical waste, industrial waste, and any mixture thereof.

Preferably, these by-product(s) are produced via pyrolysis and combustion within the pyrolysis within the crucibles. It is expected a minuscule level of oxygen within the material within the crucibles. These are hydrocarbon containing material selected from the group consisting of vaporized hydrocarbon(s), water, coal, town gas, propane ($C_3H_8$), natural gas (methane), ethane ($C_2H_4$), carbon char, hydrogen, carbon monoxide, carbon dioxide, oxygen, nitrogen, nitrous oxide, ash, and any mixture thereof.

According to a second aspect of the present invention there is provided a method of pyrolysing and combusting a material, comprising:
pyrolysing and combusting material received within one or more crucibles using heat generated within one or more heating tubes located in proximity to a chamber which contains the crucible(s);
receiving byproduct(s) produced during the combustion and pyrolysis of the material within the or each heating tube; and
pyrolysing and combusting the byproduct(s) within the or each heating tube mixed with hydroxy gas.

Suitably, the gas is supplied from a gas supply device to the or each heating tube. Preferably the gas is supplied at a pressure that this up to 300 kPa or 44 PSI.

In one embodiment, the or each heating tube is manufactured from tungsten, tungsten-molybdenum alloy, or a graphite tungsten aluminium alloy.

Preferably, the temperature generated within the crucibles is up to 3000 degrees Celsius.

In one embodiment, the materials are hydrocarbon containing materials.

Preferably, the hydrocarbon containing material is selected from the group consisting of biomass, natural or synthetic rubber-based products, natural gas, town gas, domestic waste, medical waste, industrial waste, sewage, and any mixture thereof.

Preferably, the by-product(s) produced via combustion of the hydrocarbon containing material within the crucibles selected from the group consisting of vaporized hydrocarbon(s), water, carbon char, hydrogen, carbon monoxide, carbon dioxide, oxygen, nitrogen, nitrous oxide, ash and any mixture thereof.

According to a third aspect of the present invention there is provided system, comprising:
- an apparatus comprising one or more crucible(s) for receiving a material to be pyrolysed and combusted therein; and one or more heating tubes disposed in proximity to the crucible(s), wherein the or each heating tube is configured for receiving byproduct(s) produced during pyrolysation and combustion of the material within the crucible(s) to be pyrolysed and combusted within said heating tube(s) mixed with the hydroxy gas; and
- a gas supply device operably connected to the or each heating tube for supplying a hydroxy gas to the or each heating tube for use in pyrolysing and combusting the byproduct(s) within said heating tube(s).

Preferably, the temperature generated within the or each heating tube during pyrolysis with combustion of the by-products(s) is up to 3,000 degrees Celsius.

Preferably, the material received within the crucibles is pyrolysed and combusted using the heat generated by the or each heating tube during the ongoing pyrolysis and combustion of the by-products in gaseous form or vaporised form premixed with the hydroxy gas. This is preferably achieved within the mixing chamber and the mixing cavity enclosure.

Preferably, the temperature generated within crucibles is up to 3000 degrees Celsius.

The hydroxy gas safely produces high temperatures, that may go up to 3,000 degrees. During the pyrolysis process, the hydroxy gas is acting like a plasma stream. The generated hydroxy gas is able to penetrate through any refractory material in a matter of seconds. The generation of such high temperatures is due to the phenomenon that hydroxy has a surplus number of electrons. The mix of HHO, on the flame front, is stoichiometry of the ratio 2:1 Hydrogen to Oxygen. On combustion, HHO produces high temperatures and $H_2O$ (steam). $H_2O$ can be recycled within the system. See reference 04 below.

The gas is preferably supplied from the hydroxy gas supply device 1500 to the or each heating tubes, at a pressure that falls within a range of 150 kPa up to 300 kPa.

The gas supply device preferably comprises a hydroxy electrolytic tube for electrolytically generating said oxyhydrogen, hydroxy gas. This tube is preferably self-pressurised. Preferably, the hydroxy electrolytic tube utilises water and produces hydroxy gas which is oxygen and hydrogen together. In some embodiments, within the hydroxy electrolytic tube, one litre of water produces 1,860 litres of hydroxy gas which becomes self-pressurising. Preferably the hydroxy gas has an operating pressure of up to 300 kpa. In some embodiments, the hydroxy electrolytic tube consumes about 6.2 kWh to produce 1,860 litres of hydroxy gas at NTP.

Suitably, the hydroxy electrolytic cell within the hydroxy electrolytic tube, comprises of multiple pairs of plate electrodes, fully immersed in an electrolyte solution in a spaced apart arrangement. In some embodiments, the electrolytic tube comprises one or more electrolytic cells that each comprise a pair of plate electrodes fully immersed in an electrolyte solution in spaced apart arrangement.

Suitably, the multiple pairs of plate electrodes are electrically connected to a corresponding pair of terminals of an electrical power supply.

In one embodiment, the electrolyte solution is in the form of an aqueous solution of a metal hydroxide. The electrolyte solution may be sodium hydroxide or potassium hydroxide. This is required to increase the conductivity of water and consequently generate hydroxy gas.

Suitably, the metal hydroxide is selected from the group consisting of sodium hydroxide or/and potassium hydroxide.

In one embodiment, the or each heating tube is manufactured from tungsten, tungsten-molybdenum alloy, or a graphite tungsten aluminium alloy.

In one embodiment, the material received within the crucible is a hydrocarbon containing material.

Preferably, the hydrocarbon containing material is selected from the group consisting of biomass, natural or synthetic rubber-based products, natural gas, town gas, domestic waste, medical waste, industrial waste, sewage and any mixture thereof.

Preferably, the byproduct(s) produced via combustion of the hydrocarbon containing material within the crucibles is selected from the group consisting of vaporized hydrocarbon(s), water, carbon char, hydrogen, carbon monoxide, carbon dioxide, oxygen, nitrogen, nitrous oxide, ash, and any mixture thereof.

Preferably, the system further comprises an electrical power supply, electrically connected to each of the apparatus and system and the gas supply device for supplying electrical power thereto.

In some embodiments, the system further comprises one or more air cooled heat exchangers configured to receive flue gas from one or more of the heating tubes. The system preferably further comprises one or more flue gas pumps for receiving flue gas from the one or more air cooled heat exchangers. The system preferably further comprises one or more cyclonic separators configured to receive flue gas from the one or more flue gas pumps to separate particles from the flue gas.

In some embodiments, the system comprises an array of heating tubes disposed circumferentially around the crucible(s).

In one embodiment, the system comprises:
- an array of 12 circumferentially disposed heating tubes;
- 12 air cooled heat exchangers, each configured to receive flue gas from a corresponding one of the heating tubes;
- 12 flue gas pumps, each configured to receive flue gas from a corresponding one of the air cooled heat exchangers; and
- 12 cyclonic separators, each configured to receive flue gas from a corresponding one of the flue gas pumps and to pass separated flue gas to a next heating tube in the array.

In some embodiments, the system comprises 15 vertically disposed stacks of arrays of 12 circumferentially disposed heating tubes. In other embodiments, the system or apparatus includes other combinations of vertically stacked arrays of heating tubes. Each array may include between 1 and 24 heating tubes.

The system may further comprise a density separation scraper module to perform a density separation process on flue gasses with the housing.

Preferably, during the pyrolysis and combustion in the one or more heating tubes, an amount of hydrogen, $CO_2$ and CO is reduced, and an amount of $N_2O$ and $O_2$ is increased.

BRIEF DESCRIPTION OF DRAWINGS

Preferred embodiments of the invention will now be described, by way of example only, with reference to the accompanying drawings in which.

DETAILED DESCRIPTION

It is to be understood that the following description is for the purpose of describing particular embodiments only and is not intended to be limiting with respect to the above description.

The present invention relates to an apparatus, a system and a method for pyrolysing and combusting a material. By way of example, the material may be a hydrocarbon-based waste material. A range of different materials that can be pyrolysed and combusted by the invention are described herein. However, it will be appreciated that the invention is suitable for pyrolysing and combusting various other materials. The invention is capable of pyrolysing and combusting the material at high temperatures to the point whereby the resulting flue gases produced can be subject to cryogenic or membrane separation methods to yield products that can be utilised as commodities for mitigating some of the costs associated with the pyrolysis method. At the same time, some or all of the remainder of the flue gases are rendered carbon neutral and inert and can be vented to the atmosphere without fear of polluting the environment.

Apparatus

FIGS. 1-4 and 6-9 show schematic representations of an apparatus 10 according to preferred embodiments of the present invention. FIGS. 1-4 illustrate a first embodiment apparatus 10A, while FIGS. 6-9 illustrate further embodiments 10B-E. FIGS. 5A-5F illustrate overall systems 300A-F which incorporate the embodiments of apparatus 10.

Figure 1:
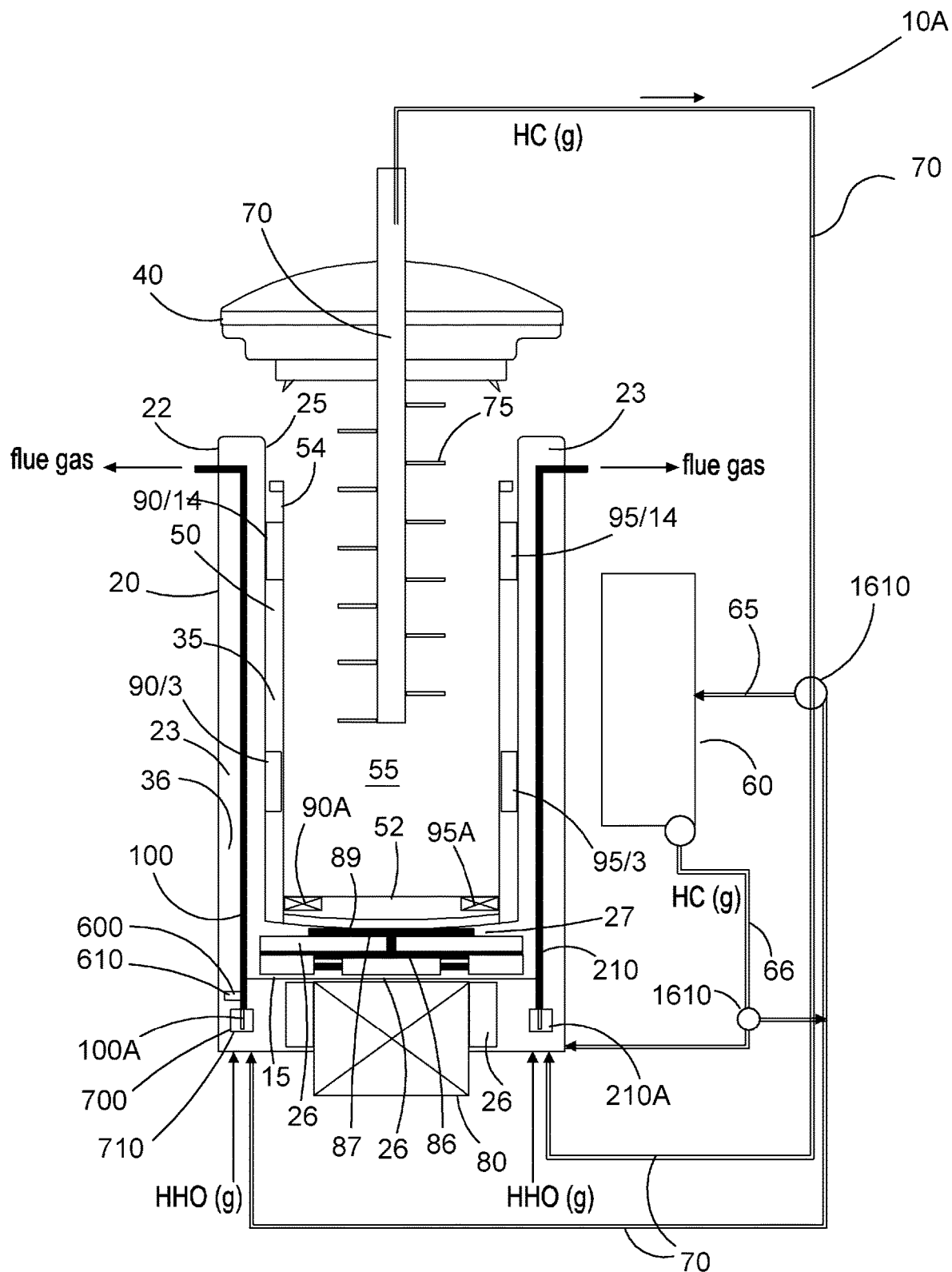
FIG. 1 shows a schematic side view representation of an apparatus for pyrolysing and combusting a material according to a first preferred embodiment of the present invention, the apparatus, being shown in an open configuration.
Figure 2:
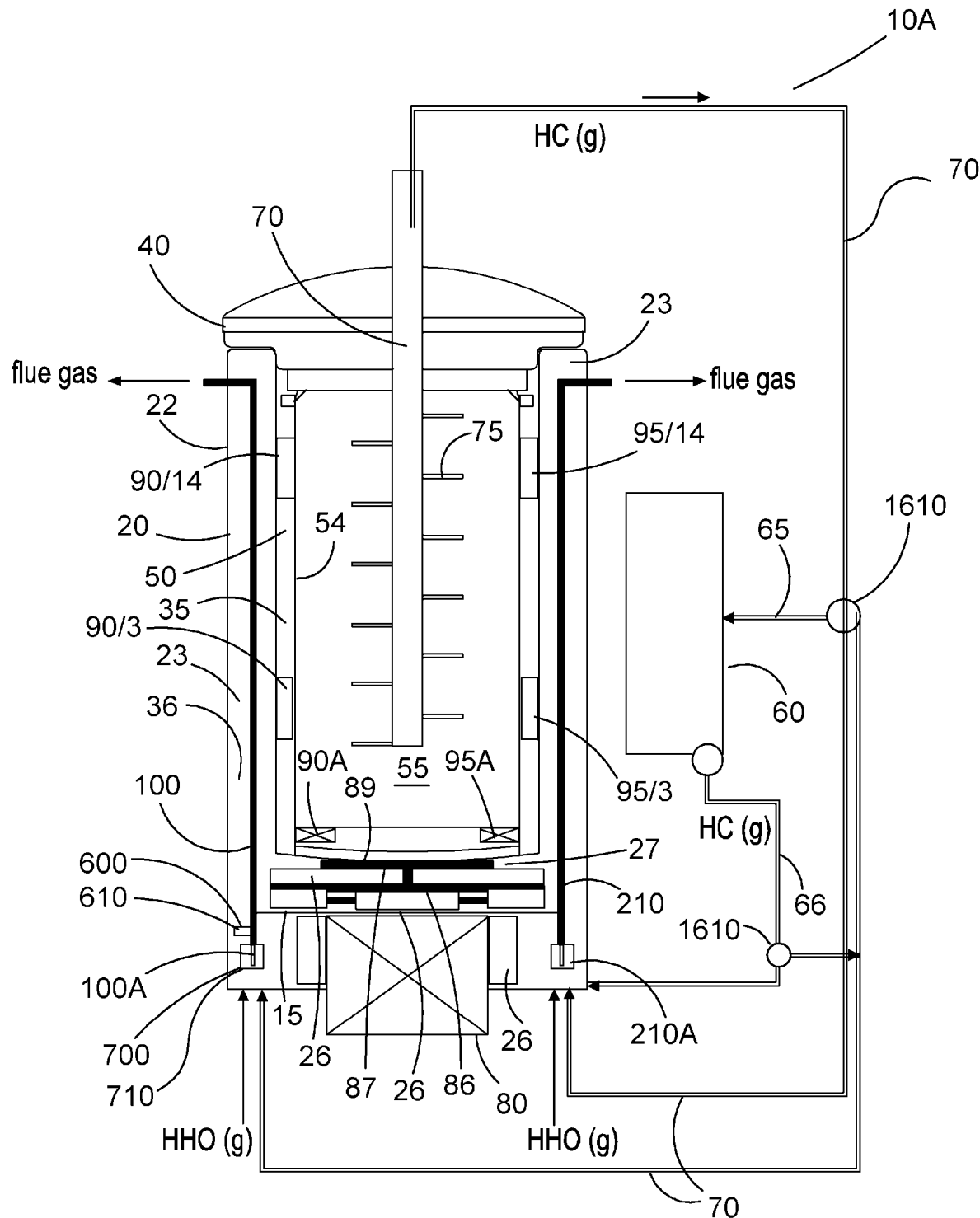
FIG. 2 shows a side view schematic representation of the apparatus of FIG. 1, being shown in a closed configuration.
Figure 4:
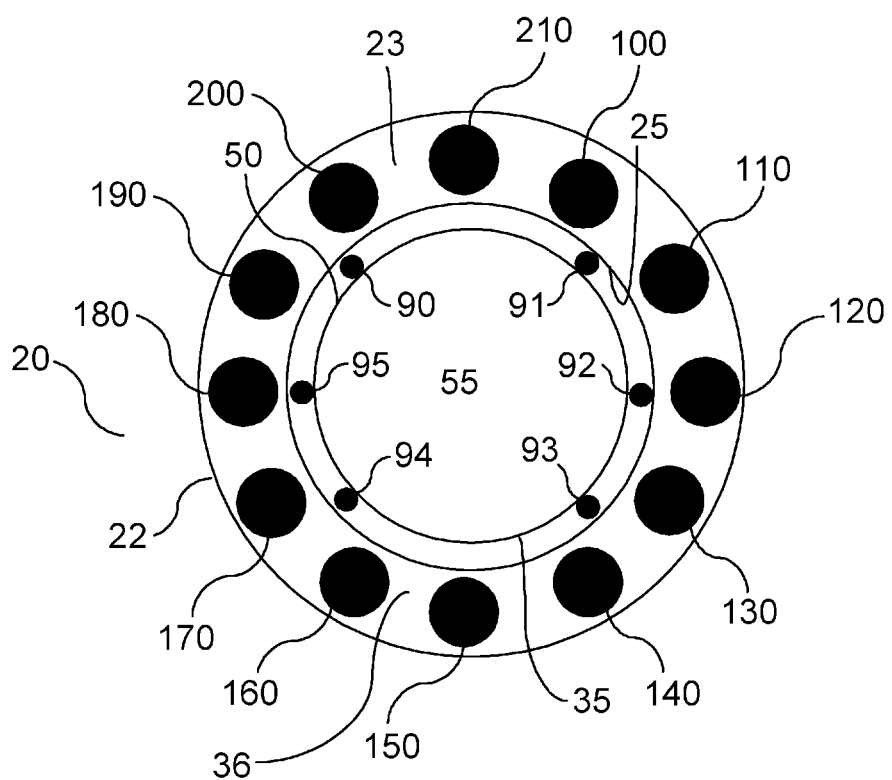
FIG. 4 shows a schematic plan view representation of the apparatus of FIGS. 1 and 2, illustrating an inside of the housing and an inside of a chamber of the apparatus.

Specifically, as shown in FIGS. 1 and 2, the apparatus 10 comprises a housing 20 defined by a generally circular base 15 and a double-wall, as defined by an external wall 22 and an internal wall 25, upstanding from the base 15 to define a cavity 23. As shown in FIG. 2, the top of this cavity 23 can be sealed by a generally circular lid 40 such that argon gas is contained within the cavity. Argon is a thermal working gas that can be recycled, and it protects all components from corrosion. Housing 20 and lid 40 collectively define a chamber 55 in which pyrolysation and combustion can occur. Mounted within the chamber 55 is a heating crucible 50. Crucible 50 is defined by a generally circular base 52, which includes or is formed of a magnetic material, and a wall 54 upstanding from the base 52 to define an open-topped crucible 50 within the chamber cavity 55. The crucible 50 is rotatable 360 degrees about a central vertically disposed axis in both a forward and backward direction during an agitation process within the chamber 55. The crucible is mounted within chamber 55 and has a diameter smaller than that of internal wall 25 of housing 20 so as to define a gap 35, as best shown in FIG. 4.

Crucible 50 is preferably formed of a material capable of maintaining strength at temperatures at or above 3000 degrees Celsius. Suitable materials include tungsten, tungsten carbide or 316 stainless steel. The material used to form crucible 50, or at least base 52, should be magnetic so as to facilitate magnetic agitation as described below.

Within gap 35, a series of side rollers 90-95 and a series of bottom rollers 90A-95A are disposed to allow the crucible 50 to be rotate relative to housing 20 and be agitated about a longitudinal axis of the housing 20 in use. Side rollers 90-95 are rotatably mounted to internal wall 25 of housing 20 while bottom rollers 90A-95A are rotatably mounted to base 52. In the illustrated embodiments, apparatus 10 includes six circumferentially disposed side rollers 90-95 and six bottom rollers 90A-95A. However, it will be appreciated that different numbers and configurations of side and bottom rollers may be implemented in different embodiments. A magnetic plate 86 is attached to or embedded within the base 52 of cavity 23 inside the housing 20 to facilitate magnetic agitation as described below.

Figure 6:
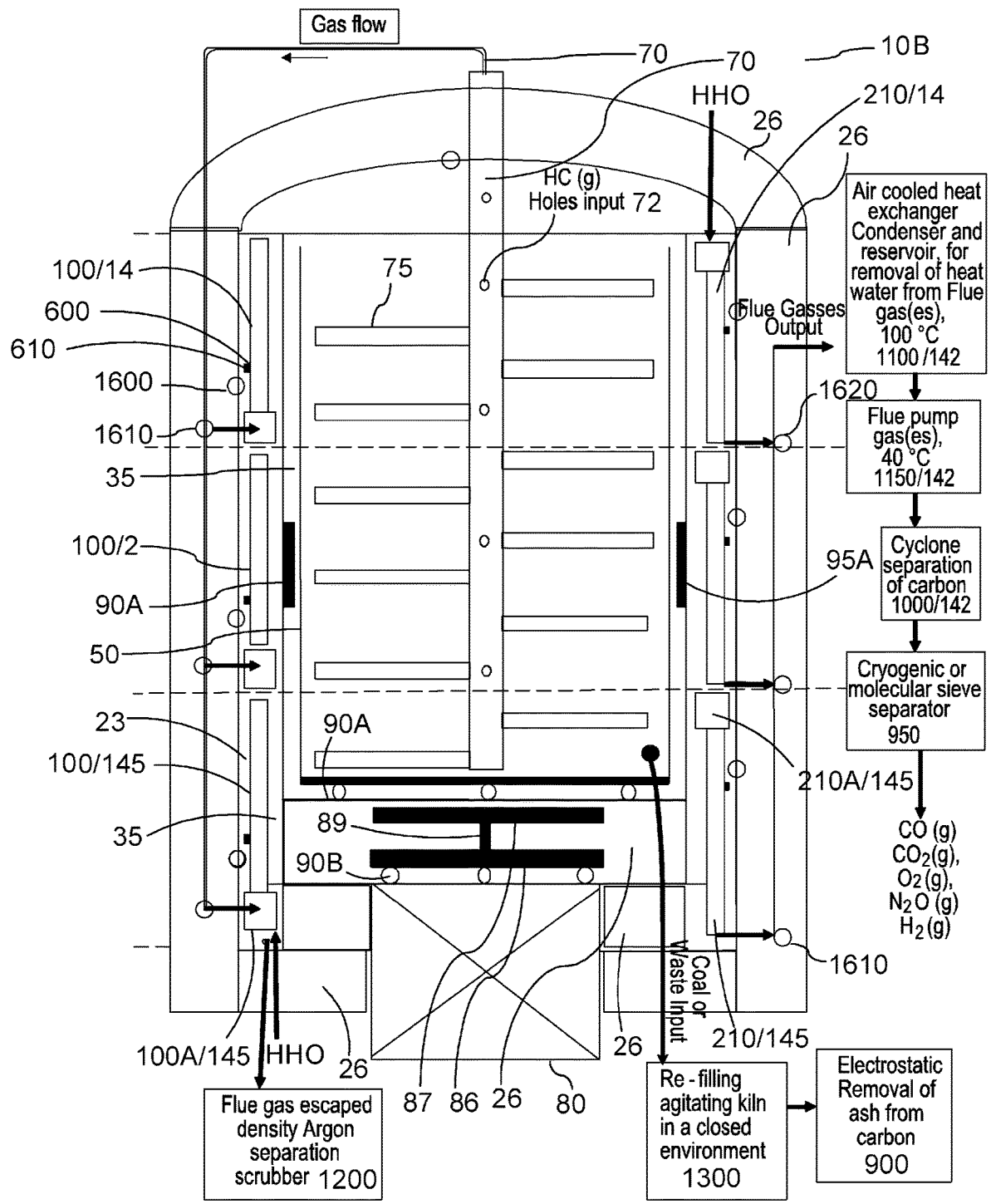
FIG. 6 shows a schematic side view representation of an apparatus for pyrolysing and combusting a material according to a second embodiment of the present invention which incorporates a single crucible and multiple arrays of heating tubes.
Figure 7:
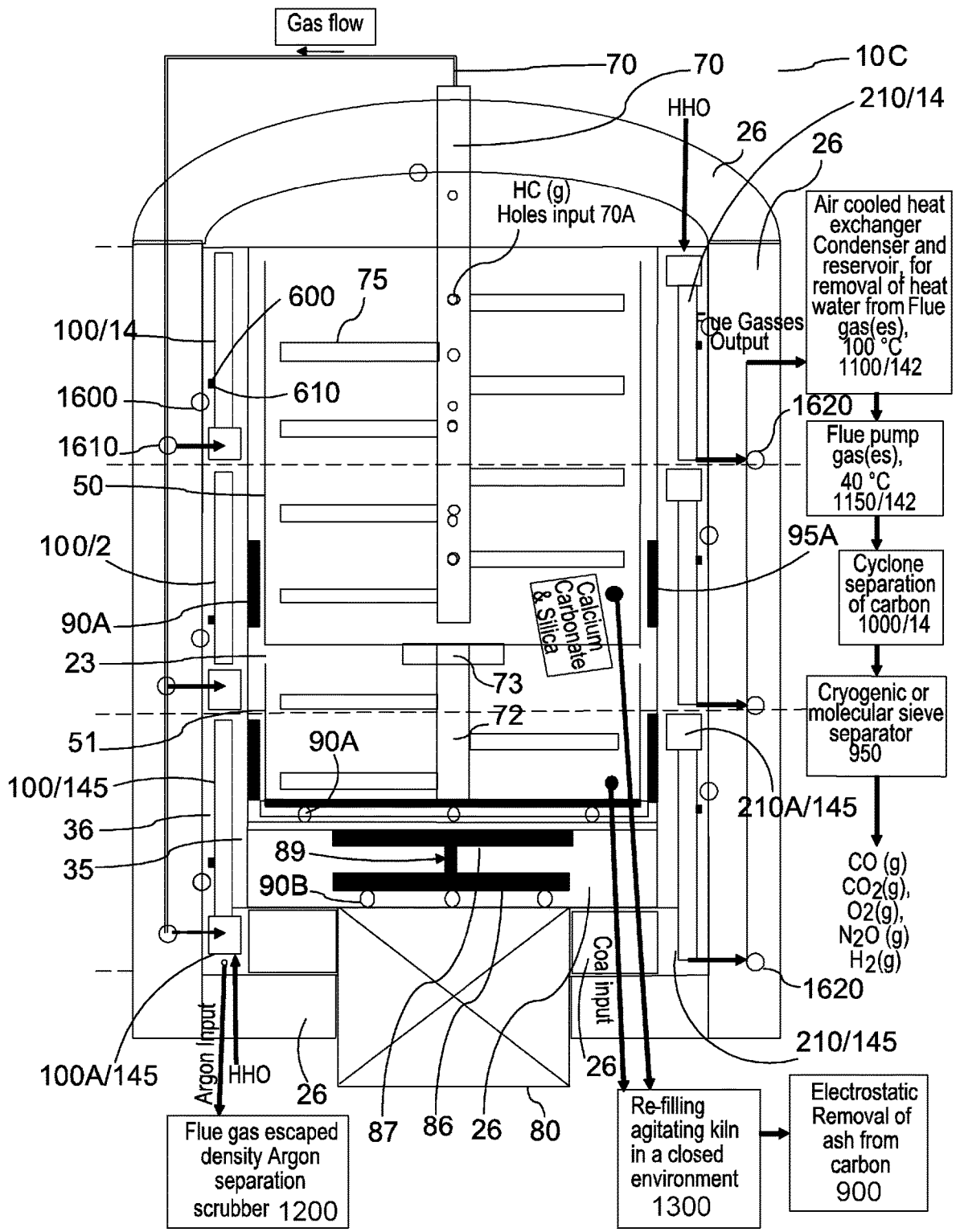
FIG. 7 shows a schematic side view representation of an apparatus for pyrolysing and combusting a material according to a third embodiment of the present invention which incorporates two crucibles and multiple arrays of heating tubes.

FIGS. 6 to 9 illustrate alternate embodiments of apparatus 10 and apparatus 10C of FIG. 7 incorporates two crucibles 50 and 51. The apparatus 10D illustrated in FIG. 8 includes no heating crucible.

It will be appreciated that the housing 20 and the crucible(s) 50-51 are both manufactured from a suitable material that can withstand high temperatures such as tungsten, tungsten carbide or 316 stainless steel.

Figure 5A:
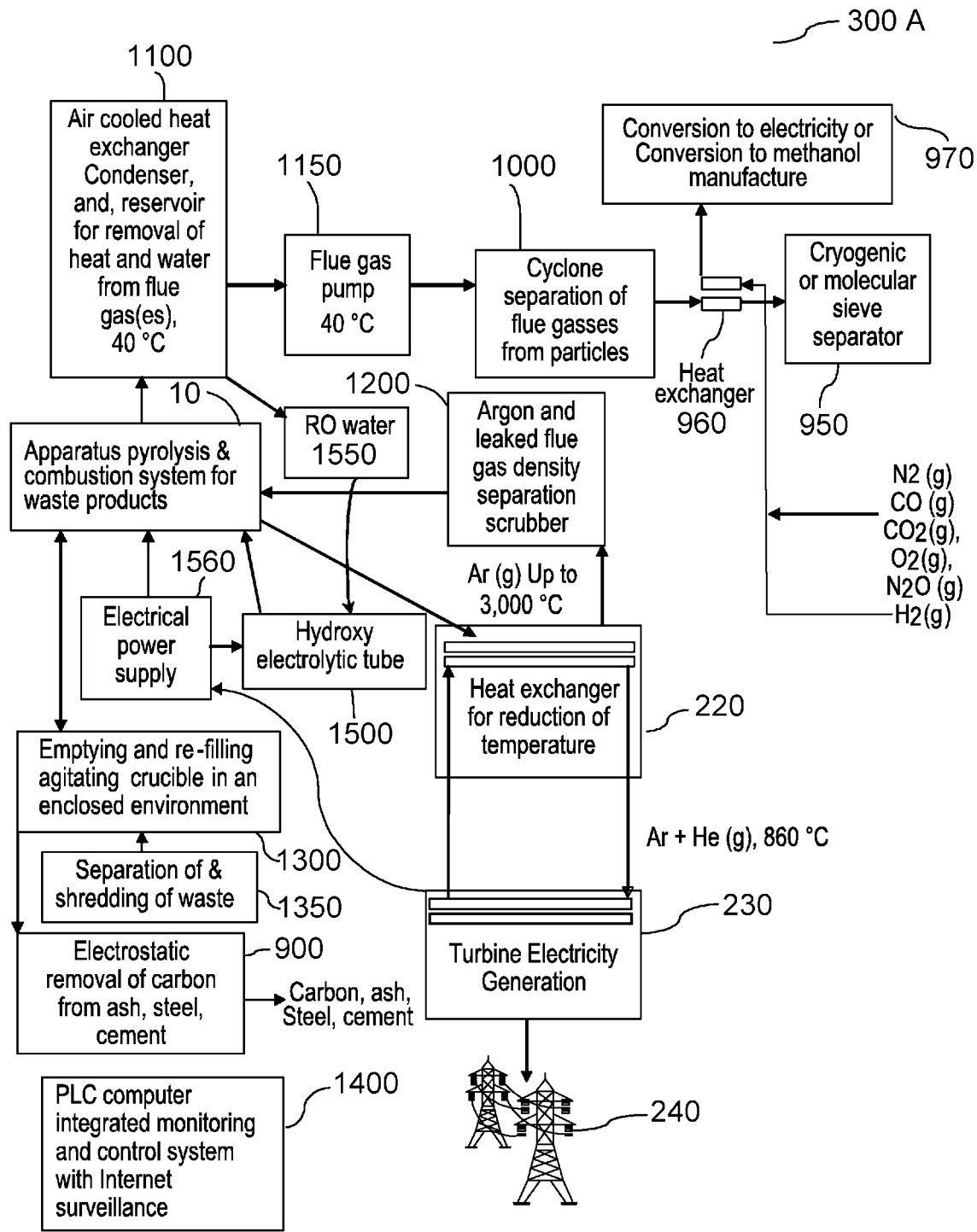
FIGS. 5A, 5B, 5C, 5D, 5E an 5F show schematic representations of an entire system for pyrolyzing and combusting a material, showing the main modules for processing waste products (as per FIG. 5A), for electricity generation via coal (as per FIG. 5B), electricity generation via natural gas (as per FIG. 5C), for cement manufacture (as per FIG. 5D), for sewage treatment (as per FIG. 5E) and for processing commentated soil and toxic waste (as per FIG. 5F)
Figure 5B:
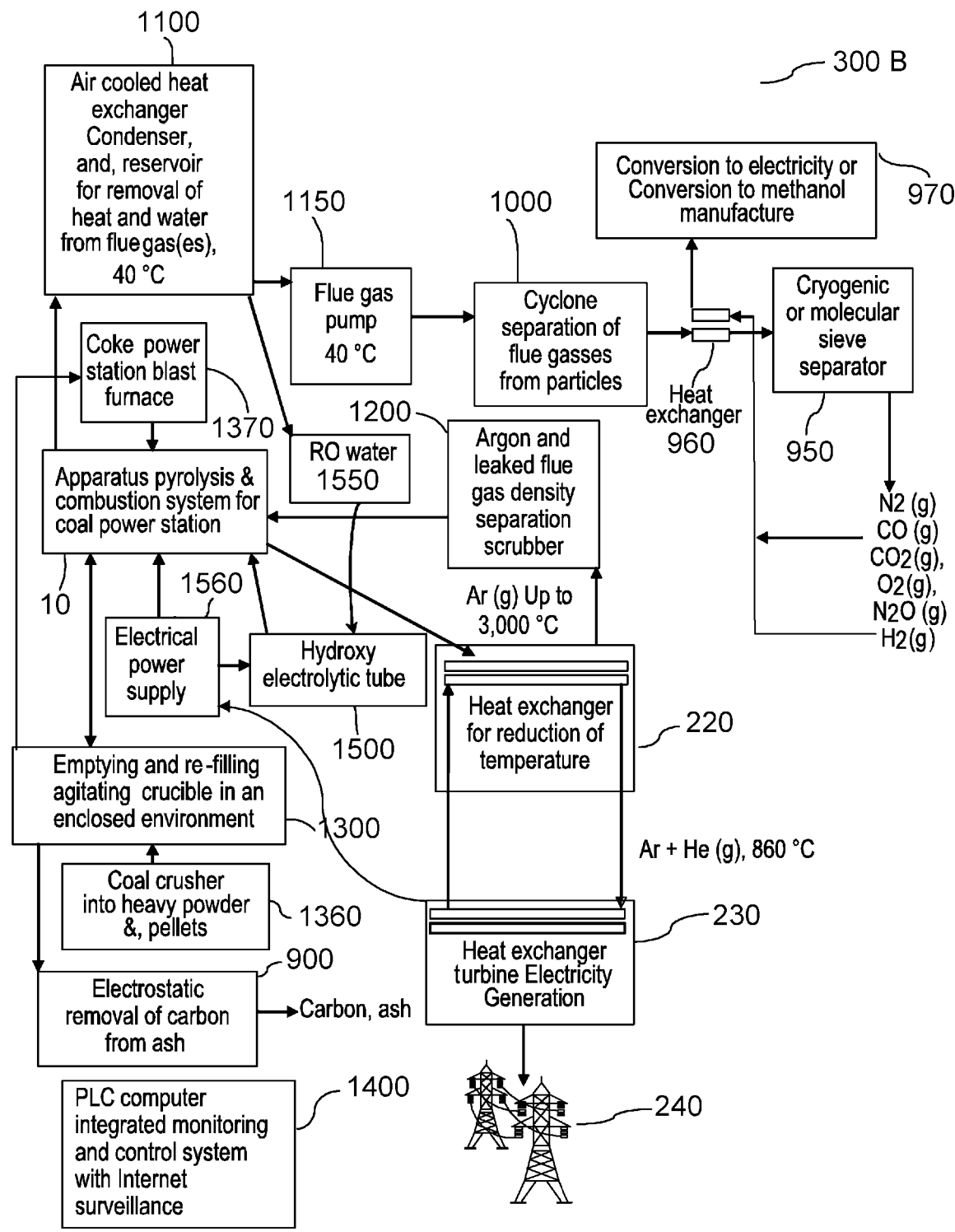
Figure 5C:
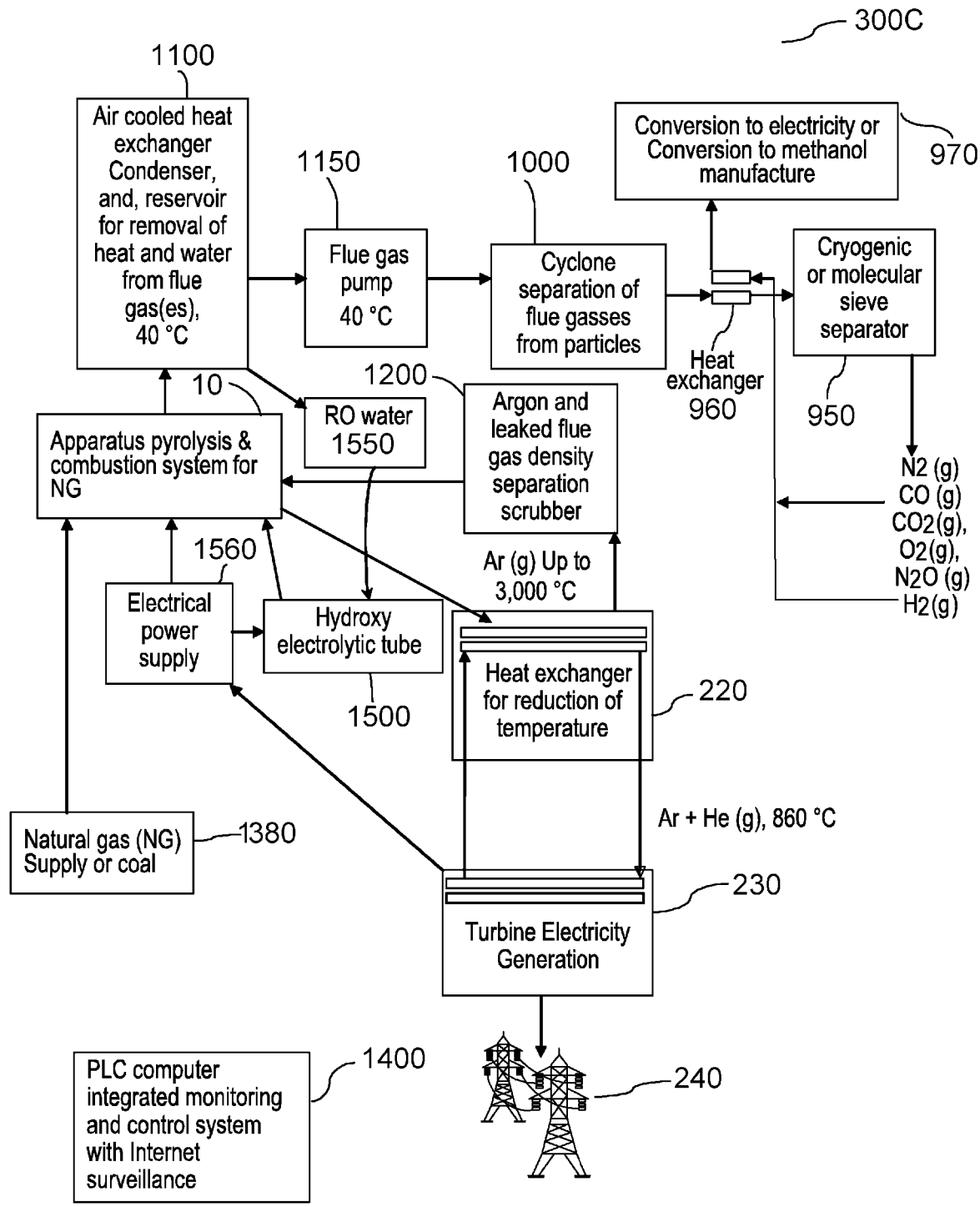
Figure 5D:
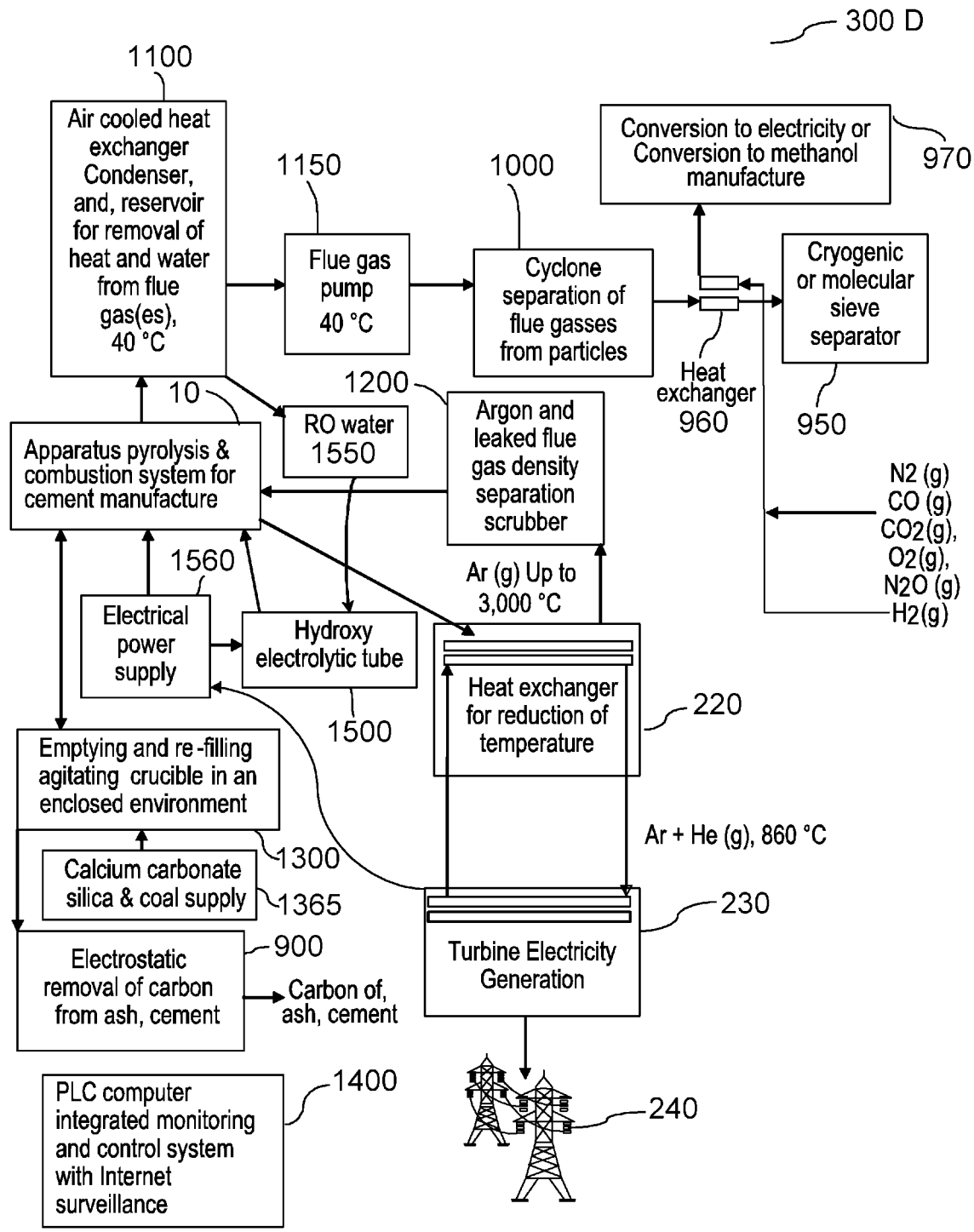
Figure 5E:
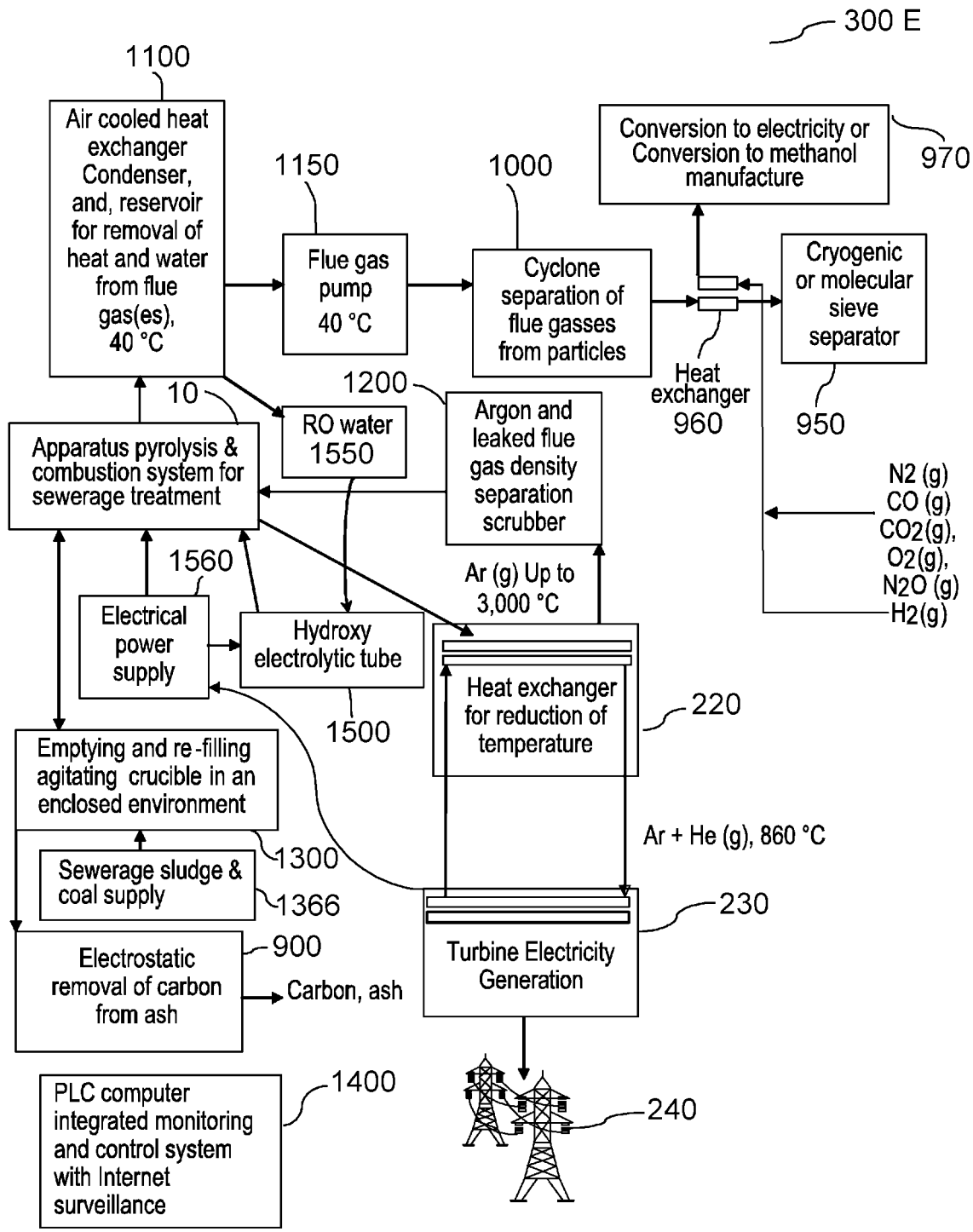

As will be described in further detail later in the description, the crucibles 50-51 are configured for receiving a range of different materials to be pyrolysed and combusted and the design of apparatus 10 may vary depending on the intended material(s) to be processed. By way of example, embodiments of apparatus 10 may be adapted to process a waste material or coal or silica and calcium carbonate (for the manufacture of cement), or contaminated soil/toxic waste or natural gas, to be pyrolysed and combusted therein. The different processes involved in the processing of these different materials are illustrated schematically in FIGS. 5A-5F. FIG. 5D illustrates a system for the treatment of cement, while FIG. 5E illustrates a system for the treatment of sewage. Only cement, sewage, toxic waste treatments require, in the current embodiments, two crucibles. A single crucible is required for the treatment of waste and for the treatment of coal, such as in a coal fire power station. An apparatus having no crucible may be used for the processing of natural gas.

To seal chamber 55, lid 40 engages an upper portion of housing 20, so as to enclose the crucibles 50-51 and sealing gap 35 using housing 20. A suitable sealing mechanism (not illustrated) such as clamps or locking mechanisms may be employed in the sealing process. In a preferred embodiment, lid 40 is manufactured from a high temperature material such as tungsten, tungsten-molybdenum alloy or similar materials able to withstand high temperatures. For improved thermal insulation, lid 40 may be insulated with refractory brick work as shown in FIGS. 6 and 7. Lid 40 should be designed so to seal tightly and not allow waste, liquids, and flue gases to escape or enter gap 35, which may cause damage to or clog rollers 90-95 and 90A-95A. At the same time, lid 40 should maintain clearance to allow the crucible (s) 50 and 51 to be agitated. With more efficient agitation and sealing within the apparatus, the gases will be formed faster and will flow upwards so that the waste material is pyrolysed quicker.

The apparatus 10 further comprises a plurality of circumferentially positioned heating tubes 100-210 located inside housing 20 and within cavity 23. As shown in apparatus 10B and 10C of FIGS. 6 and 7, this circumferential configuration may be repeated up to fifteen times 100-210/1-15 with up to fifteen vertically disposed arrays or stacks of circumferential heating tubes. In other embodiments not described herein, more than 15 circumferential arrays of heating tubes may be used.

As best shown in FIG. 4, the heating tubes 100-210 of each array are disposed circumferentially inside the housing 20 in a spaced apart arrangement between external wall 22 and internal wall 25. As will become apparent from the description below, the spaced apart arrangement of heating tubes 100-210 ensures that the waste material received within the crucibles 50-51 can be heated by the heating tubes 100-210 in a uniform manner. The space enclosed by the external wall 22 and the internal wall 25, and thus surrounding each of the heating tubes 100-210, is shrouded in an inert gas such as argon 36. The argon 36 serves to protect the heating tubes 100-210 from undergoing oxidation as a result of the high temperatures that may be produced during the pyrolysis and combustion process described in more detail below.

FIG. 4 illustrates the inside of cavity 23 and gap 35 showing example positioning of heating tubes 100-210 and side rollers 90-95. A similar layout occurs for crucible 51 illustrated in FIG. 7. Within cavity 23, the twelve heating tubes 100-210 are positioned, spaced at substantially equal circumferential intervals. Within gap 35, six rollers 90-95 are spaced at substantially equal intervals inside this cavity. As mentioned above, in some configurations of the apparatus 10, such as apparatus 10B and 100 illustrated in FIGS. 6 and 7, fifteen levels/arrays of heating tubes are provided, each having twelve tubes per level. In this configuration of the apparatus 10, three levels/arrays of side rollers are utilised, each having six side rollers per level.

It will be appreciated by persons skilled in the relevant art, that the number of heating tubes 100-210 is not limited to the twelve heating tubes 100-210 shown in the figures, but may include a greater or lesser number of heating tubes depending on the system requirements. Furthermore, it will be appreciated that other combinations of rollers and other components are possible.

In a preferred embodiment, the heating tubes 100-210 are manufactured from tungsten. In other embodiments, the heating tubes 100-210 may be manufactured from other materials such as tungsten-molybdenum alloy or ceramic tungsten or a graphite tungsten aluminum alloy or any other tungsten alloy.

Located at the base of each of the plurality of heating tubes 100-210 is a corresponding mixing chamber, as indicated by the reference numerals 100A -210A in FIGS. 1, 2, and 6-9 in respect of corresponding heating tubes 100-210. Although only two mixing chambers are illustrated, it will be appreciated that each of the twelve heating tubes include a corresponding mixing chamber. The number of heating tubes is not restricted by this design. Mixing chambers 100A-210A are preferably connected to their corresponding heating tubes by way of compression fitting and formed of similar materials to that of the heating tubes.

Figure 3:
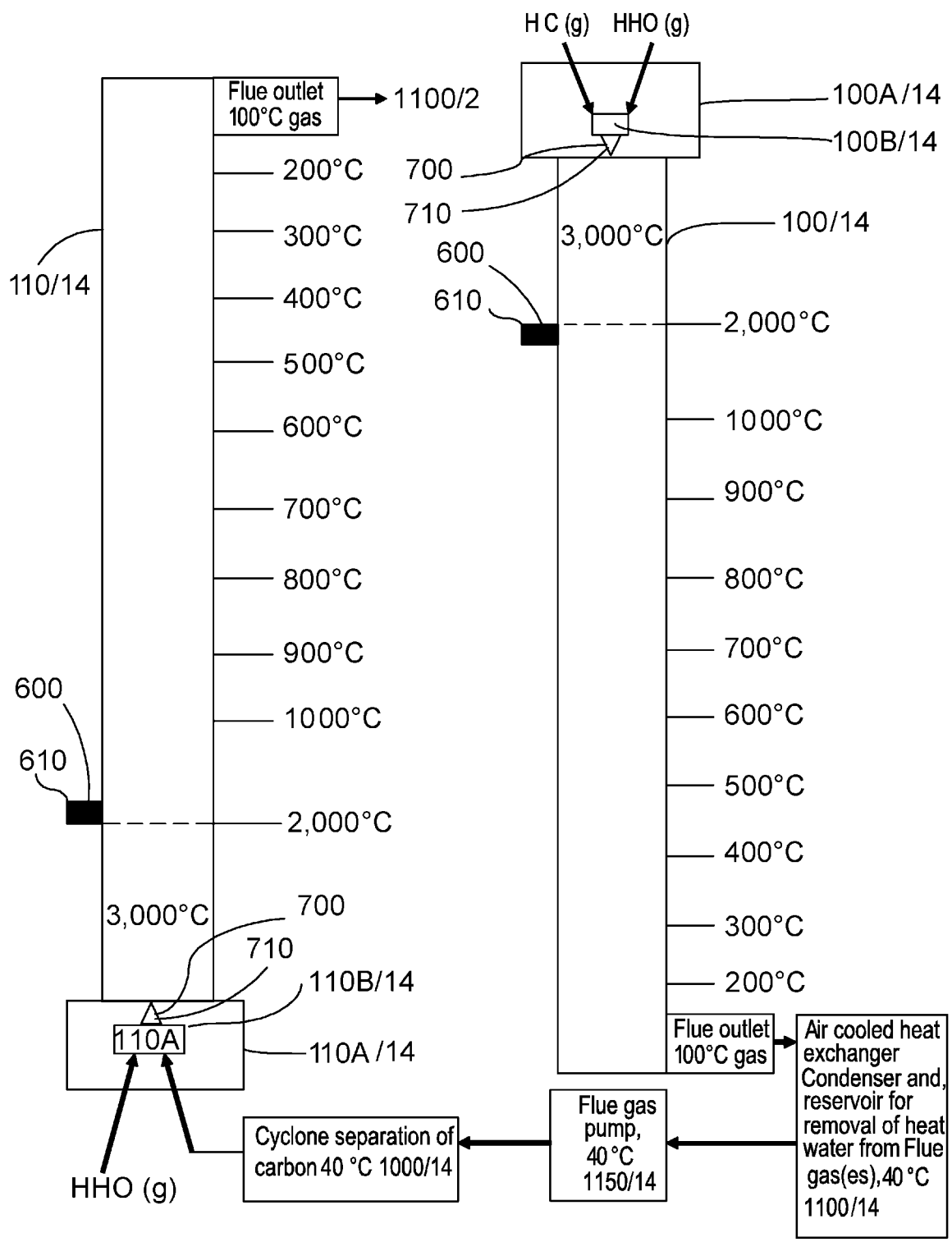
FIG. 3 shows a schematic representation of two heating tubes for use in the apparatus of FIGS. 1 and 2.

As illustrated in FIG. 3, each of the mixing chamber enclosures define a respective corresponding internal mixing cavity, designated by numerals 100B-210B. These mixing cavities provide space for the gases to be mixed before progressing to the respective heating tubes 100-210. Each mixing chamber includes a corresponding injector 700 having a nozzle and injector magazine 710 for injecting mixed gasses into heating tubes 100-210.

Figure 5F:
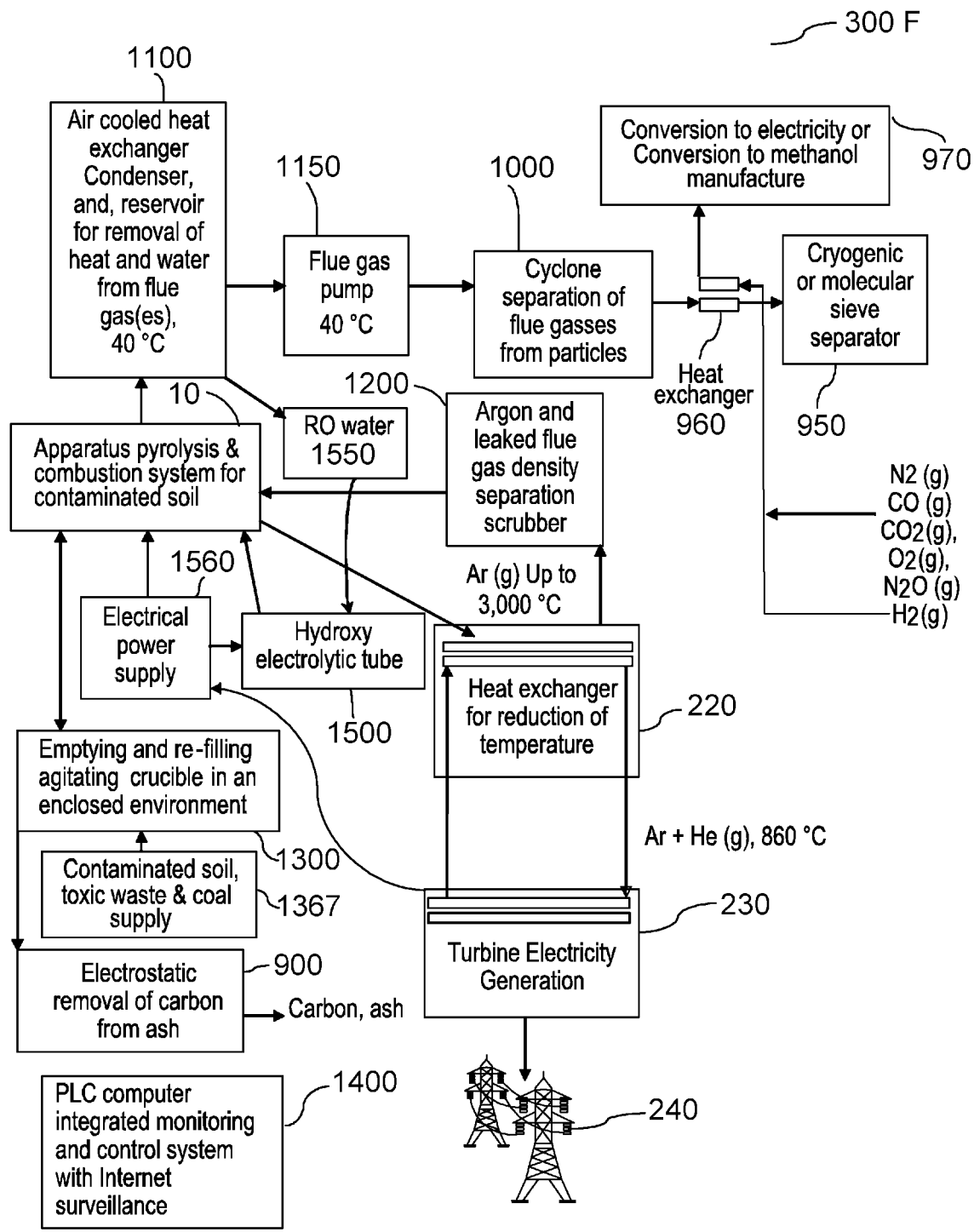

In addition to generating heat for pyrolysing or combusting material within the crucibles 50 and 51, the plurality of heating tubes 100-210 are also configured for receiving, via one or both of conduits 70 and 66, from an overflow reservoir 60, one or more byproduct(s) produced as a result of the pyrolysis and combustion of the material. In operation, the heating tubes 100-210 are capable of pyrolysing and combusting the one or more byproduct(s) in conjunction with the primary pyrolysis and combustion of the material in the crucibles 50 and 51. FIGS. 5A-5F illustrate systems in which a range of materials that can be processed by the crucibles and in turn the heating tubes. These include waste products as shown in FIG. 5A, coal as shown in FIG. 5B, natural gas as shown in FIG. 5C, cement manufacture as shown in FIG. 5D, sewage treatment as shown in FIG. 5E and contaminated soils/toxic waste as shown in FIG. 5F.

The apparatus 10 illustrated in FIGS. 1, 2 6, 7 and 9 include a pair of horizontally disposed but vertically separated magnetic drive plates 86 and 87 attached to or embedded within the base 52 of cavity 23. Both plates 86 and 87 are disposed inside the cavity 23 and are connected via a vertically extending shaft 89. Refractory bricks 26 are placed between plates 86 and 87. Magnetic drive plates 86 and 87 may be formed of tungsten or any other magnetic material that can withstand high temperatures.

The apparatus 10 further comprises a magnetic drive mechanism 80. The magnetic drive mechanism 80 activates magnetic plate 87 and shaft 89 and connects them with the magnetic plate 87 that activates the agitating crucibles 50-51. Under agitation, magnetic drive mechanism 80 rotates crucible 50 about a central vertical axis in a back and forth motion. The reciprocating rotational motion is preferably at angles less than a full 360 degree rotation.

Preferably, magnetic drive mechanism 80 is located outside of chamber 55 and is directly or indirectly mounted to base 15 of housing 20. This arrangement facilitates sealing between the housing 20 and crucible 50 such that no leakage occurs between the crucible 50 and housing 20. Below the six bottom rollers 90A-95A, refractory brick 26 is installed for thermal insulation. The bottom rollers 90A-95A are preferably positioned in a distributed manner to bear the weight of the whole crucible 50.

As is apparent from FIGS. 1 and 2, lid 40 includes an aperture that extends substantially through lid 40 and through which a conduit 70 is received. The conduit 70 is of a sufficient length to extend through the aperture into the crucible 50 when the lid 40 is engaged with the housing 20, corresponding to the apparatus 10 being in a closed configuration, as shown in FIG. 2. Conduit 70 may also extend through the refractory brick work insulation 26 and the opening of the chamber 55, to facilitate the gaseous flow of flue gases from the crucible 50 to corresponding mixing cavities 100A-210A.

Conduit 70 may comprise a single continuous element such as a tube or pipe, or may be formed of a plurality of segments joined together. The individual segments may be formed of different materials and/or have different diameters or wall thicknesses.

Within chamber 55, conduit 70 extends substantially vertically into an upper, central or lower region of crucible 50. Extending radially outwardly from a wall of the conduit 70 are a plurality of stirring rods, collectively given the general reference numeral 75. The stirring rods 75 are oriented generally orthogonal to the vertical longitudinal axis of the housing 20. The rods 75 are configured for use in agitating and breaking up the waste material or coal or silica and calcium carbonate within the crucible 50. Under agitation, crucible 50 is rotated by magnetic drive mechanism 80 relative to stirring rods 75, which act to stir the material within crucible 50. Agitation of the crucible helps to facilitate the removal of any oils or toxins from the waste material or coal or silica and calcium carbonate for the manufacture of cement during pyrolysis and combustion. Conduit 70 and/or stirring rods 75 include one or more apertures for receiving ingress of flue gases into conduit 70.

In apparatus 10C of FIG. 7, the second crucible item 51 is agitated by a high strength shaft 72 and it is agitated by a high temperature high strength gear box 73. Gear box 73 is powered by a motor (not shown) to rotationally drive shaft 72 to rotate agitating crucible 51. Shaft 72 includes one or more radially extending stirring rods to facilitate the agitation and stirring of material within crucible 51.

In a preferred embodiment, the conduit 70, the stirring rods 75, shaft 72 and gearbox 73 are all manufactured from a high temperature and high tensile strength material. The type of material that may be used are tungsten-based materials and or molybdenum-based materials and or rhenium-based materials that can withstand high temperatures up to 3,500 degrees Celsius and also have high tensile strength. These materials are used in the turbine industry and jet engine design and it will be appreciated that other materials used in those industries may be appropriate to use in the present invention.

While tungsten can maintain high temperatures, up to 3,000 degrees Celsius, it is also a brittle material. As such, components within the apparatus which are required to maintain very high temperatures, such us the rollers, heating tubes, the crucible(s), the stirring rods or other components within the housing, should preferably utilise a tungsten alloy material that has a high strength at high temperatures. One possible base material for forming such an alloy is a high temperature stainless steel that may not distort or change shape.

As shown in FIGS. 1 and 2, the apparatus 10 further comprises an overflow reservoir 60 with an electrical vaporiser that is in fluid communication with conduit 70 by virtue of input sensors 1610 and with an additional overflow conduit 65. Input sensors 1610 regulate the flue gases that are directed into the mixing cavity 100A-210A either with or without the use of reservoir/vaporiser 60. By way of example, sensors 1610 may include one or more of optical sensors to monitor the flow rates and temperature of input gases, or ultrasound flow control sensors to monitor gas flow rates, temperature sensors to monitor temperatures of gases, as well as other sensors such as fluid sensors and spectrum analysis sensors to monitor output gas composition.

Reservoir/vaporiser 60 is used to regulate the flow of flue gases from crucibles 50-51 when necessary. During pyrolysis and combustion, flue gases from crucibles 50 and 51 are output through conduit 70 and may condense during passage of conduit 70. Sensors 1610 are disposed within conduit 70 and are configured to sense the output flue gases. Depending on the volume, flow rate and/or temperature of the flue gases, sensors 1610 send signals to trigger corresponding valves (not shown) to direct the gases either directly to mixing chambers 110A-210A or into overflow conduit 65 and reservoir/vaporiser 60. If the temperature and flow rate of the flue gases are sensed by sensors 1610 to be sufficiently high, then they may be directed straight to the heating tubes. If, however, the temperature of the flue gases are sensed to be low and/or the heating tubes do not require filling, the flue gases may be directed into overflow reservoir/vaporiser 60.

Within, reservoir/vaporiser 60 the flue gases can be stored temporarily and re-vaporised and heated for subsequent supply to the heating tubes.

The gases in reservoir/vaporiser 60 are again redirected via sensors 1610 into the mixing chambers 100A/1-15, via an output conduit 66. In other embodiments of the design, conduit 70 may also be used to redirect hot unprocessed gases to mixing chambers 110A-210A/1-15, depending on the decision tables controlled by the sensors and a PLC control system (described below) and the overall flow of the system.

In a preferred embodiment, the overflow reservoir 60 and the conduits 70, 65 and 66 are all manufactured from a high temperature and high tensile strength material. The type of material that may be used are tungsten-based materials and or molybdenum-based materials and or rhenium-based materials that can withstand high temperatures up to 3,500 degrees Celsius and also have high tensile strength.

In addition to sensors 1610 described above, similar sensors may be positioned at various locations within the entire system, such as within the conduits and, heating tubes and crucible(s), to measure temperatures that may be over 2,000 degrees Celsius and all other inputs or outputs or system failures. The sensors must be designed so as to withstand high temperatures, up to 3,000 degrees Celsius. Signals from sensors 1600 may be fed to a PLC control system (described below). The PLC control system is responsive to the sensor signals to make system decisions for shut downs or redirection of inputs or outputs to other part of this system or to slow the flow of material or request immediate or scheduled maintenance of system components and so on. Sensors 1600 and the PLC control system may communicate with a system of actuators for controlling flow of flue gas and other system components.

As shown in FIGS. 1 and 2 the overflow reservoir/vaporiser 60 is in communication with the mixing cavity 100A via conduit 66, to allow byproduct(s) resulting from the pyrolysed and combusted material to flow from the crucible 50 to the respective heating tubes 100-210 to be pyrolysed and combusted therein in the presence of hydroxy gas, when ignited. Preferably, each apparatus 10 includes a single overflow reservoir 60. If multiple interconnected arrays of heating tubes are present in an apparatus, only the first heating tubes 100/1-15 of each array receive the output of reservoir 60. If a number of apparatus 10 are included in a system design 300, one or more active reservoirs 60 for the entire system 300 may be provided that service several apparatuses 10.

Apparatus 10B illustrated in FIG. 6 includes a single crucible 50 and shows the representation of multiple arrays of heating tubes. This configuration incorporates twelve heating tube arrays 100-210. These heating tubes are located inside the housing 20 and within and housing cavity 23. The apparatus 10B of FIG. 6 also includes three vertically separated arrays of six circumferentially disposed side rollers 90-95, which are secured across the perimeter of the chamber 55, attached to the internal wall of the housing 25. These side rollers are secured within the chamber item on a gap that exists between the internal wall of the housing 25 and the crucible 50. The crucible 50 is preferably removable to more easily facilitate the emptying and refilling of the crucible with the required material for the purpose of pyrolysis and combustion. The rollers 90-95 are preferably rotatably mounted at a fixed position.

Apparatus 10C of FIG. 7 includes two crucibles 50 and 51 and shows the representation of multiple arrays of heating tubes. A two-crucibles design is proposed for the production of cement by utilising coal in crucible 51 and mainly silica and calcium carbonate in crucible 50. This configuration incorporates a twelve-heating tube array, items 100-210. These heating tubes are located inside the housing 20 and within and housing cavity 23. Apparatus 100 also includes three vertically separated arrays of six circumferentially disposed side rollers 90-95. The rollers are secured across the perimeter of the chamber and attached to the internal wall of the housing 25. These rollers are secured within the chamber 55 in a gap 35 that exists between the internal wall of the housing 25 and the crucibles items 50 and 51. The crucibles 50 and 51 are preferably removable because they need to be emptied and refilled with the required materials for the purpose of pyrolysis and combustion. The rollers 90-95 are preferably rotatably mounted in fixed positions to housing 25.

For the purpose of cement manufacture, upper crucible 50 is filled with a required amount of calcium carbonate and a required amount of silica and any other required material, while the lower crucible 51 is filled with a required amount of coal to produce the town gas mixed with hydroxy gas that generates the required temperatures and energy to create cement.

In the preferred embodiments of apparatus 10, the height of the single crucible design is approx. 3 meters. The diameter of the crucible is about 21.5 cm and the circumference of the crucible is around 67.54 cm. The volume is estimated to be 108,915.08 cm$^3$. The volume of the single crucible design is around 108.97 litres. The weight of the content is estimated to be around 80-60 kg of waste per processing cycle. Each processing cycle takes approximately one hour to be completed. Per year the approximate processing of waste is around 70 kg×24 hours×360 days=604,800 kg of waste per year. This design requires twelve heating tubes around the crucible in the housing cavity. The approximate heating tube diameter in this design is about 1.2 cm with a 0.5 cm hole and being spaced apart by around 5.63 cm apart.

System

FIGS. 5A-5D includes several modules of a complete system design. These are as follows: the apparatus 10, an electrical power supply 1560 providing electricity to all modules, hydroxy cell 1500, an emptying and refilling module 1300 of the crucible, a separation of waste module 1350, and an electrostatic removal of ash and other commodities module 900 with outputs of carbon, ash steel and cement.

FIGS. 5A-5D also include an air cooler heat exchanger 1110, which is connected to the apparatus for pyrolysis and combustion system 10, a flue gas pump 1150, a cyclone separation module 1000, a heat exchanger 960, a conversion to electricity module 970, and a cryogenic separator 950 having as its outputs $N_2$, CO, $CO_2$, $O_2$, $NO_2$, $H_2$.

The cyclone separation module 1000 separates flue gases from particles (such as Carbon, ash, cement) to allow the separation of any particles from the gases which are: HC, CO, $CO_2$, $O_2$, $N_2O$, $H_2$ The cryogenic or molecular sieve separator 950 is adapted to separate gases such as CO, $CO_2$, $O_2$, $N_2$, $NO_2$ and $H_2$. The hydrocarbon was removed by the previous processes and by the 12-heating tube design configuration that works in stages. Current experimentation illustrated in examples 01-06 below indicates that just two heating tubes eliminated essentially all of the hydrocarbons and significantly reduced the levels of CO and $CO_2$. Therefore a 12-tube configuration design with a 15 deep array structure with PLC monitoring and control module is estimated to eliminate the hydrocarbons and will minimise and adjust the pollutants to the required configuration levels to produce commodities, that includes green electricity.

Furthermore, the significant number of heating tubes arranged in a loop design allows for partial pyrolysation and combustion of hydrocarbons to be performed at each stage. This allows reduction of the required input power levels to decompose the $CO_2$ at an overall reduced energy input compared to that of existing methods. This is illustrated in examples 05 and 06 below when compared to references 2-4.

FIGS. 5A-5D include a heat exchanger 220 for temperature reduction, an argon gas density separator 1200 and a temperature reduction heat exchanger 220. Finally FIGS. 5A-5D include a PLC computer system 1400 that controls operations and computer-generated actions on each of the above modules via sensors and monitoring.

Hot and polluted argon with flue gases is directed by the system, from apparatus 10 to the heat exchanger 220 to reduce its temperature. The cooled gases are then redirected to the separation scrubber 1200 for the purification of the argon gas from the flue gases. After that, the clean argon is redirected back to apparatus 10. The cleaned argon goes back into the housing cavity and the hydrocarbons are passed back into the heating tubes for further treatment.

Polluted argon from apparatus 10 arrives at the heat exchanger 220 in a heated state, up to 3,000 degrees Celsius. Hot polluted argon moves to a primary chamber of heat exchanger 220. The primary chamber of heat exchanger 220, which has argon and other mixture of gases contained therein, is designed to expand the volumes of argon and helium mix (separate area and separate gases) which are in a secondary chamber of heat exchanger 220. The argon and helium mix are supplied as input to the heat exchanger 220 and subsequently to turbine electricity generators 230 for the creation of electricity via the turbines.

The cooled and polluted argon in the primary chamber of heat exchanger 220, which is isolated from the secondary chamber, is then redirected to the flue gas separation scrubber 1200. The argon and helium gas mix from the secondary chamber is not connected or mixed with polluted argon with hydrocarbon in the primary chamber. These two sets of gases have different functions in the invention. Helium and argon mix from the secondary chamber, of the heat exchanger 220 for the reduction of temperature, and is used to create electricity via the heat exchanger and via turbine electricity generators 230. These two gases mix, and pure argon and helium remains permanently within that loop.

These two technologies for Heat exchanger for reduction of temperature and for heat exchanger and turbine electricity generation are known and established technologies and are used by our system as required to take advantage of the heat generation of the apparatus of pyrolysis and combustion and generate efficiency and cheaply green electricity.

Sensors 1600 located on components such as the heating tubes, condenser, flue gas pump and cyclonic separator may be implemented to provide information online and/or in real time. The sensors 1600 feed the data collected into the PLC computer system 1400 integrated monitoring and control, module. System 1400 is responsive to the sensor signals to control various actuators such as valves and pumps across the system to control system parameters. Actions will be taken and relayed to the appropriate module to allow the system operators and system control software to control the entire system in milliseconds, most likely from a remote location. These tight monitoring and control processes are required in case of any system emergency, to avoid mishaps or any system disasters, to address possible inefficiencies or component failures. The number of active heating tubes per array to be used may be reduced or increased for system use depending on these measurements. In some embodiments, the number of arrays of heating tubes currently 15, positioned one on top of each other, can be changed.

A primary role of the sensors and the PLC system 1400 is to measure in all detail input gases, output gases, particles such as ash, carbon and cement and all waste material and gases for each of these components or modules and report the data in real time back to the PLC for processing.

The configuration of the PLC computer integrated monitoring and control system 1400 requires integrated logic that embraces all aspects of the overall design for all modules and all components of this system, including mechanical, electronic, pneumatic and hydraulic. The PLC logic is adapted for sending and receiving data and commands to these modules and these components online in real-time taking all data into consideration and adjusting all flows appropriately to ensure the safety of the overall system 24×7.

In some embodiments, the PLC computer integrated monitoring and control system 1400 will execute workarounds, diagnostics and set maintenance protocols when and if these changes are demanded. The PLC module 1400 may also schedule engineering actions. One purpose of the overall PLC system command structure design, module is to ensure efficiency, safety and to regulate the inputs, outputs in every form so that waste material elimination, cement production, green electricity production, carbon and all other commodities production is executed is the most cost effective way ensuring at all times safety, integrity of the system and the employee.

The PLC system design is preferably internet connected to a head office for monitoring, control and overwriting of decisions when this is required. The PLC system command structure design module will impact the operations and configuration of all proposed designs, waste management, Coal, natural gas treatment, cement manufacture, sewerage treatment, contaminated soil and toxic waste treatment.

The configuration of the PLC, computer integrated monitoring and control system 1400 may regulate and adjust the input components output components of apparatus 10.

The configuration of the PLC, computer integrated monitoring and control system 1400 may also allow for regulating all material in the emptying and re-filling the agitating crucible(s). This material may be waste material for waste to energy production or coal for the coal fire power station to produce electricity or silica and calcium carbonate with coal required to produce cement. This material may be natural gas, sewerage treatment material, contaminated soil, and toxic waste treatment material.

In a preferred embodiment, the gas for use in pyrolysing and combusting the byproduct(s) is oxyhydrogen gas, often referred to under alternative names such as "hydroxy gas", "Brown's gas", or even "HHO" gas on account of the 2:1 ratio of the hydrogen ($H_2$) to oxygen (O) components associated with oxyhydrogen gas.

As shown in FIGS. 5A-5F, it will be appreciated that the oxyhydrogen (HHO) gas may be generated by a gas supply device 1500 that forms part of the overall system 300, and which is operably connected to each of the plurality of heating tubes 100-210 in multiple consecutive arrays 1-15 for supplying oxyhydrogen (HHO) gas thereto by way of the corresponding mixing chambers, such as mixing chamber enclosure 100A-210A.

In a preferred embodiment, the oxyhydrogen (HHO) gas is supplied to the heating tubes 100-210 at a pressure from 150 kPa to 300 kPa via the hydroxy electrolytic cell 1500.

In a preferred embodiment, the gas supply device takes the form of an electrolytic cell 1500, as shown in FIGS. 5A-5F, that comprises a pair of plate electrodes, each having one end electrically connected to a corresponding one of a pair of terminals of an electrical power supply 1600 and the opposing end immersed in spaced arrangement in an electrolyte solution in the form of an aqueous solution of a suitable metal hydroxide such as sodium hydroxide or potassium hydroxide.

In a preferred embodiment, the plate electrodes are manufactured from base metals.

As shown in FIGS. 5A-5F, the electrical power supply 1560 is also electrically connected to the apparatus 10 for use in powering the magnetic drive mechanism 80 to agitate the crucibles 50-51 in use. Only one magnetic drive 80 is required for up to two crucibles 50-51 and one lid 40. Further, one conduit 70 and rods 75 are required per apparatus. For the two-crucible apparatus 10C of FIG. 7, a high strength shaft 72 and a high strength gear box 73 are required to control agitating crucible 51 sitting below crucible 50. However, multiple interconnected arrays of heating tubes 100-210/1-15 are needed, which are stacked within each apparatus 10 design.

Method

According to another aspect of the present invention, there is provided a method for pyrolysing and combusting a material using an apparatus 10 as described above. The crucibles 50-51 facilitate the process of pyrolysing and combustion using heat generated in the heating tubes 100-210/1-15.

In particular, the method is directed to pyrolysing and combusting a hydrocarbon-based waste material such as those described above or coal or silica and calcium carbonate for the manufacture for cement, with a view to producing byproduct(s) that are either useful as commodities to offset the costs associated with the pyrolysis method, or are sufficiently pyrolysed and combusted to the point that they are inert and thus capable of being disposed of in a safe and environmentally friendly manner. See FIGS. 5A-5F for the treatment of various materials by the combustion and pyrolysis process.

Prior to adding the material to the crucible(s) to be pyrolised, some materials require a degree of pre-processing. All input materials that are not combustible should be removed in a sorting process. Example materials that should be removed include rocks, glass, bricks, tiles and ceramics. In each system designed to pyrolise different materials, the sorting process will have variations. As part of waste management, certain toxins and contaminated soil should be removed from what is considered acceptable household waste. Actions such as shredding of materials to an appropriate size and mixing should also take place before any acceptable material is placed into the crucible(s) for combustion and pyrolysis. A system designed to process natural gas does not require sorting of solid materials but requires a regulated supply of natural gas. These different configurations are adjusted and regulated by the PLC monitoring and control module.

The method comprises as initial pre-processing steps of separation and shredding of waste (as per module 1350 of FIG. 5A) or coal crushing (as per module 1360 of FIG. 5B). In the gas supply system 300C of FIG. 5C, natural gas is supplied to the apparatus by module 1380. In the cement manufacture system 300D of FIG. 5D, calcium carbonate, silica and coal is supplied to the apparatus at module 1365. In the sewerage treatment system 300E of FIG. 5E, sewerage sludge and coal is supplied to the apparatus at module 1366 and the agitating crucibles are emptied and refilled at module 1300. These initial steps are required in receiving waste material or coal or silica and calcium carbonate for the manufacture of cement or sewage or contaminated soil and toxic waste and cement manufacture. No sorting of material is required for the treatment of NG. These initial steps provide inputs to apparatus 10.

To kick-start the combustion process within apparatus 10, these steps need to happen first. Once the material within the crucible is received, the lid 40 is used to seal the loaded crucibles 50-51 within the housing 20 of the apparatus 10. Then, the material is heated to temperatures of up to 2,000 degrees Celsius by feeding a mixture of oxygen and liquefied petroleum gas (LPG) or natural gas into the plurality of tungsten heating tubes 100-210 via the corresponding mixing chambers, such as mixing cavity 100A -210A in respect of tungsten heating tubes 100-210. The number of heating tubes 100-210 is not restricted by this design also the number of arrays of stacked heating tubes 1-15 is not restricted by this design.

Once the temperature within the crucibles 50-51 reaches up to 600 degrees Celsius, pyrolysis with combustion starts to occur, and the waste hydrocarbon-based material starts to thermally decompose or dissociate, resulting in the formation of byproduct(s) in the form of vaporized hydrocarbons, collectively referred to as HC (g), and vaporized oil.

In a further step, the vaporised hydrocarbon (HC (g)) byproduct and the vaporised oil by-products produced during pyrolysis and combustion, flows either through the conduit 70 or via the reservoir 60 as shown in FIGS. 1-2, toward the mixing chamber enclosures 100A associated with the tungsten heating tubes 100, by the mixing cavities 100B. The first in line heating tubes push the subsequent partially processed gases to the next heating tube 110 and so forth in a sequence until these gases reach final heating tube 210. As per FIG. 3, before the partially processed gases are progressed to the next heating tube, they are moved into an air cooler 1100/1-12 to a flue gas pump 1150/1-12 and to a cyclonic separator 1000/1-12. This process is repeated twelve times for each heating tube.

This process in the illustrated embodiments, passes between apparatus 10 and cyclonic separator 1000 twelve times, before the cyclone separation of carbon and cement step is fully completed and progresses to heat exchanger 960. Conduit 70 transfers the gasses from crucibles 50-51 to the mixing chambers 100A/1-15 via the process explained above and as shown in FIG. 3.

Here, the by-products(s) are mixed with oxyhydrogen (HHO) gas in the mixing cavity 100B-210B, and the byproduct(s)/gas mixture then enters the tungsten heating tubes 100-210, as shown in FIG. 3.

FIG. 3 shows the two first mixing chambers, items 100A and 110A and the mixing cavities 100B and 110B, where the hydroxy gas is mixed with vaporised polarised and combusted gases, from the crucibles 50-51. The diagram includes an electronic ignition device 600 and ignition magazine 610, and an injector 700 and injector magazine 710. FIG. 3 includes indicative input and output temperatures of these two heating tubes, with temperatures of the gas starting at zero degrees Celsius within cavity 100B advancing up to 3,000 degrees Celsius and gradually reducing back to 100 degrees Celsius upon exit to an air cooler heat exchanger 1100/1. The gases are then passed to a flue pump 1150/1 and cyclone separator 1000/1 before they renter the heating chamber 110A/1. This process is repeated twelve times for each subsequent heating tube in the preferred configuration and for each of the fifteen levels for each chamber 55 within the housing item 20. The number of electronic ignition devices 600, ignition magazines 610, injectors 700 and injector magazines 710 is proportional to the number of heating tubes in the apparatus.

Once the byproduct(s)/gas mixture has entered the tungsten heating tubes 100-210 the method comprises, as a next step, igniting the oxyhydrogen (HHO) gas component of the mixture by use of an electronic ignition device 600 and associated ignition magazine 610. These devices, which are illustrated in FIGS. 1-3,6-7, are electrically connected to each of the plurality of heating tubes 100-210, where the heat generated as a result is sufficient for use in pyrolysing and combusting the byproduct(s) within the tungsten heating tubes 100-210. The hydroxy gas is gradually produced sufficiently and the LPG/natural gas with oxygen are gradually reduced. In turn, power is generated by the system, (starting with the LPG/natural gas) to self-sustain the ongoing production of hydroxy gas required for the heating tubes.

As shown in FIG. 3, the heat generated as a result of igniting the oxyhydrogen (HHO) gas component of the mixture within the exemplary heating tube 100/1-110/1 (as representative of the plurality of tungsten heating tubes 100/1-15, 210/1-15) reaches a temperature up to 3,000 degrees Celsius as pyrolysis and combustion of the byproduct(s) occurs within the heating tubes.

During pyrolysis and combustion, in the heating tubes 100-210, the byproduct(s) from the combusted hydrocarbon based material, namely vaporized hydrocarbon (HC (g)) and vaporized oil, are thermally degraded or dissociated over time into a mixture of pyrolysis products that exit the exemplary/typical tungsten heating tube 100 from the upper to lower portion thereof as a flue gas mixture. Upon exit from each heating tube, the byproduct(s) are passed to the heat exchanger 1100, the flue gas pump 1150 and the cyclonic separator 1000 as they move from the first heating tube to the final heating tube in the array. Hence, for the embodiments illustrated in FIGS. 3,4,6-7 and 9, the process is repeated twelve times.

According to a fourth step, the method comprises the step of utilising the heat up to 3,000 degrees Celsius generated within the tungsten heating tubes 100-210 during the pyrolysis and combustion step to combust the hydrocarbon-based material within the heating tubes. At this point, the oxygen/(LPG) or natural gas mixture used to kick-start the combustion process according to the first step is no longer required and can be stopped, so that any further pyrolysis and combustion of the hydrocarbon-based material within the crucibles 50-51 can be achieved through the use of the heat generated within the tungsten heating tubes 100-210 during the pyrolysis and combustion step.

In fact, the heat generated within the tungsten heating tubes 100-210 amount is sufficient to raise the temperature within the crucibles 50-51 up to 3,000 degrees Celsius. The inventor has found that this temperature is sufficient to combust a wide variety of hydrocarbon-based waste materials including, for example, biomass, natural or synthetic rubber based products, silica and silica carbonate for the manufacture of cement, town gas/coal, domestic waste, medical waste, toxic waste, sewage, contaminated soil, NG, industrial waste or any mixture thereof, to the point where the resultant byproduct(s) comprise vaporised hydrocarbon (HC (g)) and vaporized oil. See FIGS. 5A-5F for a non-exhaustive variety of products that can be processed by, item 10.

The temperature produced within the crucibles 50-51 can be controlled by virtue of the presence of the inert gas(es) such as argon, being circulated around the tungsten heating tubes 100-210. The argon and/or other inert gas(es) is contained within the housing cavity 23.

The inventor's research indicates that the pyrolysis and combustion of the hydrocarbon based waste material in the presence of the oxyhydrogen (HHO) may yield, amongst others, the following important pyrolysis and combustion products: water, carbon char, carbon dioxide, carbon monoxide, oxygen, nitrogen, nitrous oxide and high volumes of hydrogen. This phenomenon is a result of the affinity or attraction of the hydrocarbons to the oxygen and thus the production of carbon dioxide and carbon monoxide as a first reaction. The secondary reaction is the combustion of hydrogen to produce water. The overall reaction produces high volumes of hydrogen because of the hydrogen content in the vaporised hydrocarbon (HC (g)) when mixed with the oxyhydrogen (HHO) gas.

The carbon char and ash can be disposed of without the need for chemical means using, for example, a simple separation method such as electrostatic separation of ash, steel, carbon and cement. This is illustrated in module 900 of FIGS. 5A-5F, 6-7. For instance, when the pyrolysis and minimal combustion process has been completed, the carbon char and ash that remains is substantially sealed within the crucibles 50-51 by capping the crucibles 50 with lid 40 and then removing the sealed crucibles 50-51 from the gap 35 of the chamber 55. The carbon char and ash can then be either disposed of in a safe and environmentally friendly manner or used for other purposes.

Once the crucibles 50-51 have been emptied, these can be filled with further material(s), during a refilling step performed at module 1300, and loaded back into the apparatus 10 for pyrolysis and combustion.

It will be appreciated by persons skilled in the relevant art, that the apparatus 10 is thus basically equipped to receive a succession of crucibles 50-51 in turn, thereby rendering this a continual process for pyrolysing with combustion waste material or coal or silica and calcium carbonate required for the manufacture of cement and for the variety of materials used.

As shown in FIG. 3, the temperature within the heating tube 100 reaches up to 3,000 degrees Celsius to allow pyrolysis and combustion at high temperatures. However, gradually as the flue gases travel toward the outlet, the temperature within the heating tube is lowered and the flue gases eventually exit the heating tube at temperatures of around 100 degrees Celsius in the preferred embodiments. Pressure of around 40 PSA moves the gases from one tube to the next utilising first a condenser 1100, then a gas pump 1150 and subsequently a cyclonic separator system 1000. Each tube fitting requires a condenser and a pump mounted outside the refractory brick work 26.

It will be appreciated by persons skilled in the relevant art that the cooling of the flue gases within the tungsten heating tubes 100-210 can be achieved by any one of several means. For instance, in a preferred embodiment, the cooling is achieved by argon 36 as cooling agent, within cavity 23. See FIGS. 4,6-7.

As shown in FIG. 5A-5F, it may be possible to use a cryogenic or molecular sieve separator 950 to separate the flue gases generated following the pyrolysis and combustion step to produce such commodities as carbon dioxide and carbon monoxide to produce dry ice, liquid oxygen, liquid nitrous oxide and gaseous hydrogen to produce either electricity or methanol.

Moreover, the high percentages of hydrogen, carbon dioxide and carbon monoxide separated from the flue gases make them suitable for application as syngas for the catalytic conversion to useful alcohols such as methanol or combusted with air/oxygen to produce electricity as per step 970 of FIGS. 5A-5F.

Any nitrogen present within the flue gases, will have little or no effect on the catalyst conversion process, and can simply be vented into the atmosphere, as per process 970 in FIGS. 5A-5F.

Alternatively, or in addition to any $H_2$, $N_2$, CO or $CO_2$ separated out from the flue gases in process 950, these gases may be looped back via an appropriate conduit and used as refrigerants to assist the incoming flue gases for the cryogenic separation of the flue gases. This, in turn improves the heat exchange and conversion to electricity or conversion to methanol in steps 960 and 970. Further, this process may be achieved without generating of any pollutants.

Similarly, by attaching an air cooled heat exchanger condenser 1100 to extract the water from the flue gases by condensation and thereafter a flue gas pump 1150 and cyclonic separator 1000 to the output of each of the tungsten heating tubes 100-210, it becomes possible to use centrifugal force to isolate any carbon powder that may have been produced or cement particles in separator 1000. The extracted water from the air-cooled heat exchanger condenser 1100 can be recycled and placed back in the hydroxy electrolytic cell 1500 after it is filtered by reversed osmosis or filtration principles in reverse osmosis module 1550.

The carbon powder is generally of a purity that renders it suitable for use in several applications, such as a pigment for use in the paint and/or ink industry or for graphite manufacture. The cement is part of the cement manufacturing process. The electrostatic separation process removes these materials from the valuable carbon. This is achieved in the electrostatic separation process 900. FIGS. 5A-5F illustrate the differences in treatment of various materials. In all treatments, in step 1000, the cyclone separation of particles from flue gases is used for the removal of all particles from the gases.

As shown in FIGS. 5A-5F, 6-7 the inert gas, argon 36 is used to prevent oxidation of the arrays of tungsten heating tubes 100-210 in apparatus 10. The inert gas argon 36 controls the temperature within the housing 20 within the chamber 55 and within the crucibles 50-51. These items are heated by the heat generated within the arrays of tungsten heating tubes 100-210 during pyrolysis and combustion. The inert gas(es) expands within the confines of the double wall 22, 25 of the housing 20.

As show in FIGS. 5A-5F,6-7 as a result, it may be possible to exploit this expansion after the increase in pressure and temperature and transfer hot argon gases from apparatus 10 to the heat exchanger 220 for reduction of temperature and use the heat as the required energy at a lower temperature to power the turbine electricity generation at step 230. The hot inert gases, argon 36 and the leaked flue gases are moved to the argon and flue gases recycling and separation scrubber 1200. The leaked gases are redirected from scrubber 1200 back to the heating tubes 100-210 and the cleaned argon 36 is transmitted back to the housing 20 of apparatus 10. It also follows that electricity is redirected back to electrical power supply 1560 from the turbine electricity generation 230 to generate electrical power that can be used to supply additional electricity to the apparatus 10, to the hydroxy electrolytic tube 1500, which is the hydroxy gas supply device and all other modules of system 300.

To achieve this, the inert argon gases 36 exiting the apparatus 10 up to 3,000 Celsius must be cooled using heat exchanger 220 to a temperature of around 860 degrees Celsius or less, thereby enabling the inert gases to be used to drive the blades of the turbine 230 without causing heat damage to the blades, see FIGS. 5A-5F.

Inside the hydroxy electrolytic tube 1500, polymers may be used for the purpose of insulation. The hydroxy electrolytic tube 1500 should be earthed to remove static electricity as it is a safety and reliability concern. Elsewhere in apparatus 10, instead of polymers outside the device, materials such as stainless steel or steel that can be earthed may be used to avoid issues associated with build-up of static electricity.

The AC/DC electrode design inside of the hydroxy electrolytic tube 1500 may be sealed with fire choke and Teflon packing. This action will maintain the hydroxy pressure around 40 PSI (300 kPA). It will also seal the electrolyte and it will maintain the electrical insulation. This design configuration should be resistant to break down as it is inert and is a ceramic. Further, the solutions within the hydroxy electrolytic tube which include NaOH or KOH will not react with the proposed sealing compounds.

The water configuration used for the hydroxy electrolytic tube 1500 may preferably be protium water, having one electron and one proton. This water will increase the efficiency in the production of hydroxy gas.

Using the operation of the heat exchanger 220 and turbine electricity generation module 230 in the presently described embodiments can provide an improved Carnot cycle. The apparatus 10 can improve the efficiency of the turbines, in the turbine electricity generation module 230 because of the extensive and ongoing heat produced by the apparatus, up to 3,000 degrees Celsius. The current efficiency of the turbine electricity generation module 230 is 35%. The improvement in efficiency provided by embodiments of the present invention is estimated to be up to 60% because of the high temperatures achieved.

Figure 8:
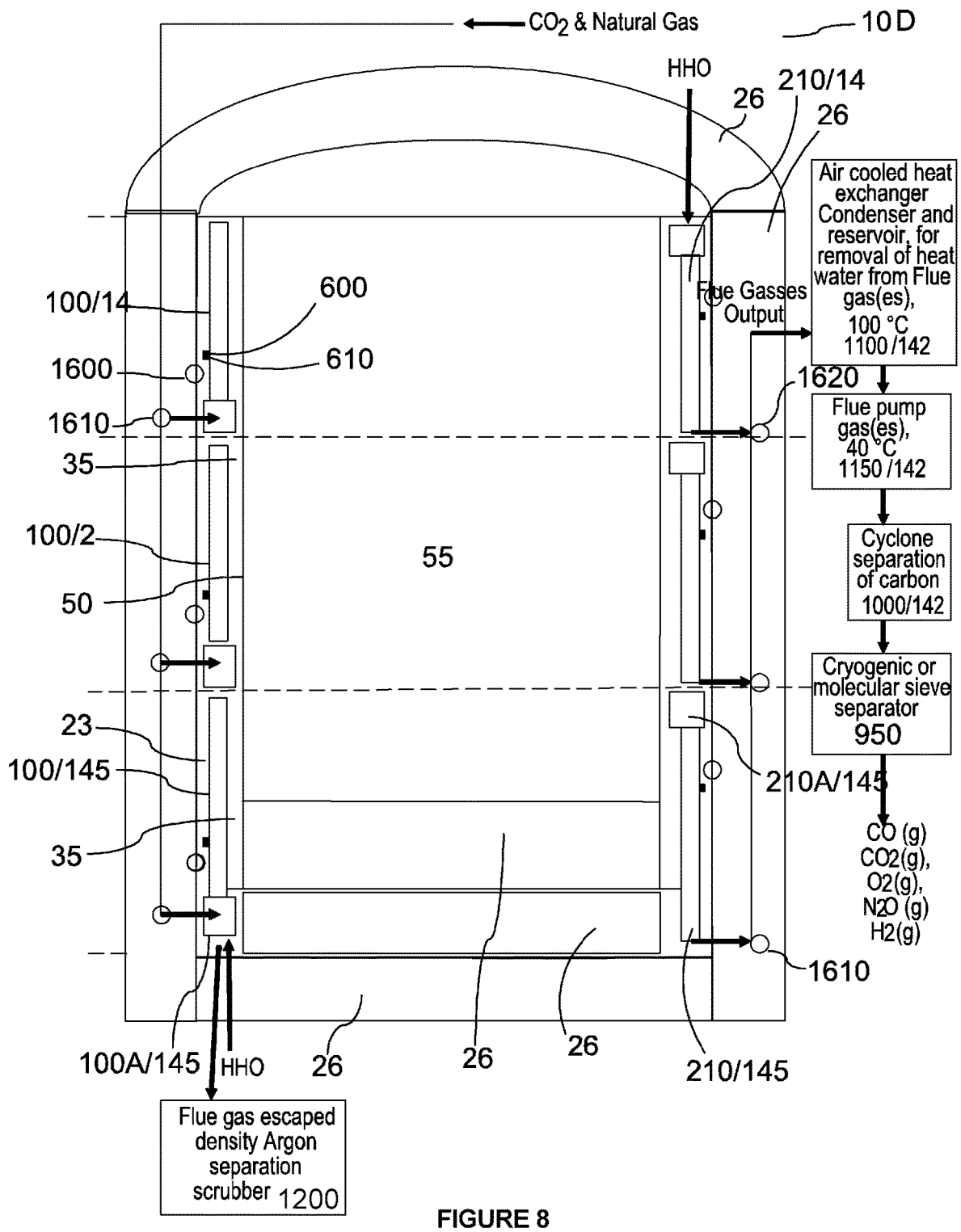
FIG. 8 shows a schematic side view representation of an apparatus for pyrolysing and combusting a material according to a fourth embodiment of the present invention adapted for treatment of natural gas.
Figure 9:
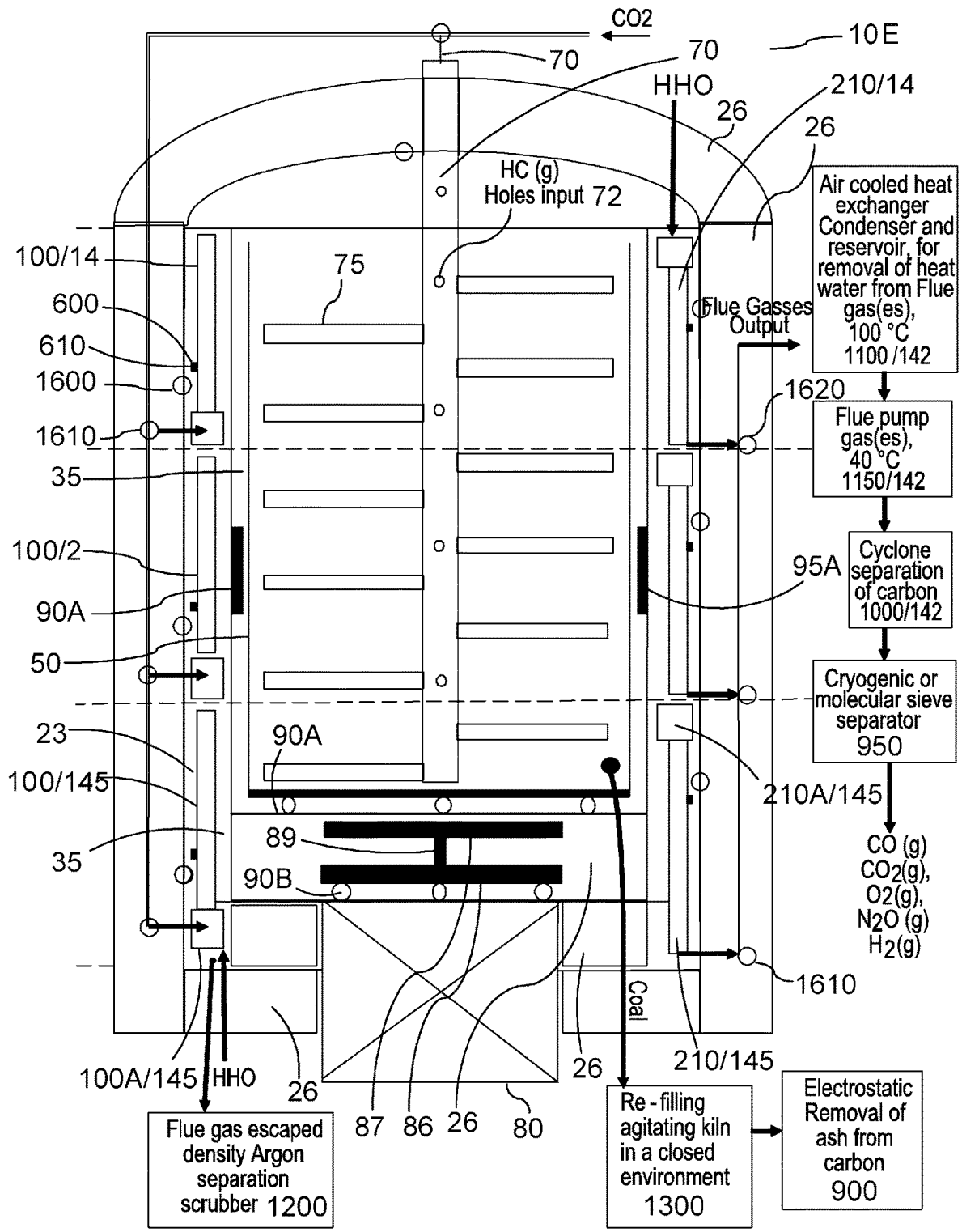
FIG. 9 shows a schematic side view representation of an apparatus for pyrolysing and combusting a material according to a fifth embodiment of the present invention adapted for treatment of natural gas.

In apparatus 10D of FIG. 8 for the processing of natural gas, the process will gradually reduce within the system via the heating tubes and effectively eliminate the $CO_2$ gases. Due to the high efficiencies of the Carnot cycle, the higher levels of electricity produced will be redirected back into the system for the additional production of hydroxy gas.

The apparatus 10D for treatment of natural gas CO and $CO_2$ described above can also be used for methanol production. This also eliminates CO and $CO_2$ emissions from these pollutants.

As shown in FIGS. 6-7, electricity from the electrical power supply 1560 will be directed to the magnetic drive mechanism 80 to supplement the electrical power provided to these devices. In addition, electricity supply 1560 provides ongoing electricity to the PLC computer integrated monitoring and control system 1400. Preferably, all modules of system 300 are connected to the electricity power supply 1560. Preferably all modules of system 300 are bidirectionally connected to the PLC system 1400, which acts as the command and control module of the entire system 300.

As illustrated in FIGS. 5A-5F, any excess electricity can simply be transferred back to the electricity grid 240 as a further means by which to offset the costs associated with the pyrolysis and combustion method.

In one preferred device configuration illustrated in FIGS. 1,2-6-7, electronic ignition device 600 is a replaceable electronic ignition device such as a high temperature spark plug. Magazine 610 is a magazine design delivery mechanism with multiple clean spark plugs stored therein. The magazine 610 is adapted for delivering replacement high temperature spark plugs 600, when the active spark plug becomes clogged up due to carbon built-up. Magazine 610 may also include or be associated with an ultrasonic mechanism that is used for the removal of carbon buildup on the active spark plug 600.

In apparatus 10A illustrated in FIGS. 1-2, nozzle 700 is a replaceable injector nozzle that is required to inject the mixed gasses into the tungsten reaction tube 100-210. Magazine 710 is a magazine design mechanism with multiple clean injectors that is used for the automatic removal or an active injector with a new clean injector when the active injector is clogged up due to carbon built-up. Magazine 710 will remove the active injector and replace it with a new one. Magazine 710 may also be an ultrasonic mechanism that is used for removal of carbon buildup on the active injector.

The above described mechanised delivery system including the magazines 610 and 710 may be adapted to shield the injectors and spark plugs from exposure to high temperatures. At the flame front, the hydroxy gas is injected at relatively low temperatures. Further down from the flame front, the pyrolysis and combustion are activated and that achieves high temperatures that may go up to 3,000 degrees Celsius.

In a further preferred device configuration illustrated in FIGS. 5A-5F, the system 300 includes heat exchanger/condenser 1100 is an air cooled heat exchanger condenser and reservoir for the removal of heat and water from flue gases that are produced from the heating tubes items 100-210 and from the crucibles 50-51. The above described configuration includes twelve air cooled heat exchangers that are configured to service fifteen layers of heating tubes 100-210/1-15, see FIG. 4,6-7. In one embodiment system 300, up to one hundred and sixty apparatuses 10 may be serviced concurrently. In turn, it follows that one hundred and sixty pairs of crucibles 50-51 may be serviced concurrently. For treatment of NG, no crucible is required (see FIG. 5C).

Each crucible communicates with 12 condensers and each of the condensers communicates with one of the 12 flue gas pumps. Each of the flue gas pumps communicates with one of the 12 cyclones. The ratio of air coolers, flue gas pumps and cyclones are preferably 1:1. 160 crucible designs include 12 condensers. The ratios for crucible design within the chamber 55, to condensers is preferably 1:12. The ratio of condenser to pump is preferably 1:1. The total number of crucibles included to condensers is 160 crucibles to 12 condensers. Note also that each row of tubes requires the use of all 12 condensers, 12 pumps and 12 cyclones according to the embodiments described above. Note that a crucible design includes one or two crucibles 50-51, within the chamber 55. However, it is envisaged that additional crucibles may be employed in future designs without departing from the spirit of the invention.

In a further preferred device configuration, the system 300 includes pump 1150 is configured to extract flue gases from the condenser 1100 and pumping these into the cyclone 1000. The above described embodiments include twelve pumps that are configured to service fifteen layers of heating tubes 100-210/1-15, as illustrated in FIG. 6. However, in other embodiments, system 300 may service up to one hundred and sixty apparatus 10 with agitating crucibles 50-51.

In the embodiments of FIGS. 5A-5F, the system 300 includes cyclone separation system 1000 of flue gases and particles for the removal of particles from the flue gas. The ratio of the pump systems to cyclone separation system is preferably 1:1, with twelve pumps connected to twelve cyclone separation modules via a separate conduit. For the overall design of the system of 160 agitating crucibles design, items 50-51, within apparatus 10 the configuration includes twelve air coolers, twelve pumps, and twelve cyclones 1000. Particles such as carbon, graphite, ash and cement are extracted within cyclone 1000, collected and removed from the system, as valuable commodities.

In the embodiments of FIGS. 5A-5F, the system 300 includes the cryogenic and/or molecular sieve separation subsystem 950. The ratio of the cyclone separation system 1000 to the heat exchanger 960 and to the cryogenic separator 950 is preferably 12:1. The flue gases from cryogenic separator 1000 are redirected via a common conduit into the heat exchanger 960 and then to the cryogenic or molecular separator 950. These commodities are produced within subsystem 950, $N_2$, CO, $CO_2$, $O_2$, $N_2O$ and $H_2$. The commodities, such as $N_2$, CO, $CO_2$ and $H_2$, that the subsystem 950 outputs are redirected via a heat exchanger 960 to refrigerate the incoming flue gases from cyclone separation system 1000 and then these gases are redirected into electricity conversion module 970 for the conversion to electricity or the manufacture of methanol.

In the embodiments illustrated in FIGS. 5A-5F, the system 300 includes a heat exchanger 960 for the gases $N_2$, CO, $CO_2$, $H_2$ for the treatment of hot gases arriving from the cyclone separation of flue gases from particles, cyclone separation system 1000 prior for the gases directed into the cryogenic molecular sieve separator 950. Heat exchanger 960 refrigerates the incoming flue gases utilising the $N_2$, CO, $CO_2$, $H_2$ as a refrigerant which is around 190 degrees below. The gases used in heat exchanger 960 are released in controlled amounts using the PLC module 1400.

In some embodiments, the system 300 requires conversion of gases $N_2$, CO, $CO_2$, $H_2$ into electricity or to methanol manufacture at step 970. The inputs of this system are controlled amounts of output gases, these are, $N_2$, CO, $CO_2$, $H_2$ from heat exchanger 960 at room temperature. These are processed after the required treatment in cryogenic molecular sieve separator 950 and heat exchanger 960. These modules are controlled by the PLC 1400.

Embodiments of the system 300 further includes electrical power supply 1560, which provides electricity to all module in system 300.

Embodiments of the system 300 include the hydroxy electrolytic tube 1500 that is providing hydroxy gas. The gas is redirected to heating tubes 100-210 of apparatus 10 at room temperature at around three atmospheres. However, it will be appreciated that the gas may be provided at higher or lower temperatures and pressures.

Embodiments of the system 300 include the step 1300 of emptying and refiling the crucible in an enclosed environment. This may be an automated process where around 15% of the material that is left over in the crucible, mostly carbon, is removed safely from the crucibles. The crucibles 50-51 are refilled and returned to apparatus 10. During the emptying process all left over gases are returned to apparatus 10 and reprocessed via the heating tubes 100-210. These gases must be first pumped via flue gas pump 1150 in to the cyclone separation system 1000 and then pushed pack into the heating tubes 100-210 of apparatus 10. In the embodiment of FIG. 5A, the material used is waste products, in FIG. 5B the material is for the treatment of coal, in FIG. 5C, the material is NG/natural gas, in FIG. 5D, the material for the manufacture of cement which is silica, calcium carbonate with coal having two crucibles, in FIG. 5E, sewerage treatment material, and in FIG. 5F contaminated soil and toxic waste. The treatment of NG in the embodiment of FIG. 5C does not require a crucible, just the heating tubes.

In some embodiments, system 300 includes one hundred and sixty apparatuses 10 and includes 28,800 hydroxy electrolytic tubes 1500. That is, for the 160 apparatuses 10, hydroxy is provided from 28,800 cells/tubes 1500. However, it will be appreciated that systems incorporating other numbers of apparatus 10 may be developed within the spirit of the invention.

Embodiments of the system 300 include the module 900 for performing electrostatic removal of carbon from ash, steel, and cement. This process includes the magnetic separation of steel from the ash. In this process, the steel is first removed and then the carbon is removed from the ash and the cement. This may be implemented as an automated process. The outputs of this process are carbon, ash, steel, and cement. The NG treatment illustrated in FIG. 5C does not require module 900. With the NG treatment, additional $CO_2$ and CO may be injected into apparatus 10, via the heating tubes. These pollutants are mixed with NG and hydroxy gas and are pyrolysis combusted by the system. A separation of carbon and oxygen from the hydrocarbons CO and $CO_2$ is performed by the entire system.

Embodiments of the system 300 include heat exchanger 220 for the reduction of the temperature from the argon 36, as per the embodiments of FIGS. 1 and 2 heated from the heating tubes 100-210, within the housing 20 of apparatus 10. In addition, gases may be leaked from the heating tubes which are also present within the housing cavity 23. These leaked flue gases are mixed with argon 36 and therefore must be extracted and removed from the cavity and directed to the heat exchanger 220 and the contaminated argon cleaned. The PLC module 1400 and system sensor may be used to keep these flue gases in safe concentration.

In some embodiments, the system 300 includes turbine electricity generation 230. The electricity is forwarded to an external system entity of the grid 240 or it is redirected back in the system 300 via the electrical power supply 1560.

Some embodiments of the system 300 includes an argon and leaked flue gas density separation scrubber 1200. Scrubber 1200 performs a separation scrubber process in which the reduced temperature argon 36 and flue gases are taken from heat exchanger 220. Example gases scrubbed from the heat exchanger 220 include Ar, HC, CO, $CO_2$, $N_2$, $N_2O$, $H_2$ and $O_2$. The uncontaminated argon gases are redirected back to apparatus 10 into cavity 23 and the leaked flue gases are redirected back into the heating tubes 100-210, of apparatus 10 via the mixing chambers 100A-210A. This process is controlled and regulated by the PLC module 1400.

Some embodiments of the system 300 include the PLC computer integrated monitoring and control systems 1400 with internet surveillance. PLC control system 1400 is preferably connected to all modules in the system 300 of FIGS. 5A-5F via the appropriate monitoring system. The PCL control system makes decisions according to a decision table, written by the system architects.

One reason that the system includes a like number (e.g. 12) of air cooled heat exchangers, pumps and cyclones is because gases of identical or similar makeup are being treated for each of the heat tube stages, depending on their stage of pyrolysis and combustion within the heating tube design.

Each heating tube on each of the 15 arrays, from /1-5 depending on their position on the array from position 1-11 from /1-15 will have similar or identical mixture of flue gases because of their position in the pyrolysis and combustion process. The 1-12 stages during the flue gas processing and therefore the 12 air coolers /1-12 and 12 pumps /1-12 and 12 cyclone from /1-12 for flue gas separation of particles are positioned so that each of these pieces of equipment, starting with the air cooler heat exchange condensers accept input from all heating tubes that are in position one. Stage 1, which is designated /1 and air cooler heat exchange condenser two gets all gases from all 15 tube arrays on stage 2 /2 in position 2 and so on until air cooler heat exchange condenser 15 gets all gases from all tubes that are in stage 12 which is position /12. In addition, the flue gases are extracted from the emptying and re-filling the crucibles 50-51 in an enclosed environment at module 1300. These gases from module 1300 are pumped by the pump 1150/12 into the cyclone separation 1000/12. From there they are directed back into tube 210/1-15 for apparatus 10.

The above described embodiments may be adapted to process up to 116 kilos of waste per hour when using 15 arrays of 12 heating tubes. Using an embodiment having a single array of 12 heating tubes, between 7-10 kilos of waste per hour can be processed. As an example, the waste product combination may comprise: 20% tyres, 34% paper/carboard, 32% plastic, 7% food scrubs, 7% toxic soup.

For the treatment of waste material, one crucible is required and it is expected that the outcomes from the crucible run are around 15% ash, around 82% carbon black.

For the creation of cement, two crucibles are required. In a top crucible, a mixture of 70% calcium carbide and 10% silica is input. This material on completion of the process will be fully transformed to cement. In a bottom crucible, a mixture of 20% coal is input to be used as fuel to heat the top crucible. On the completion of this process the coal will be transformed ⅔ to coke and ⅓ to town gas. Therefore 13.33% of the overall mixture on completion will be transformed into coke and the town gas will be mixed with hydroxy gas to generate high levels of heat inside the heating tubes.

For the creation of electricity with a coal fire power station design, one crucible is required. It is expected that the inputs of that crucible will be 100% coal. The outputs of the crucible on completion will be ⅔ coke and ⅓ town gas. Therefore 66.67% of the overall mixture on completion will be transformed into coke and the 33.33.% will be mixed with hydroxy gas to generate high levels of heat within the heating tubes.

The overall system design may require the construction of sealed rooms for execution of these processes due to the creation of toxic fumes and pollutants within the overall system which will be captured and eliminated or processed within the overall system. Toxic fumes are looped safely back into the heating tubes, without any human hand intervention, only via automation and PLC control. For example, emptying and refilling of the agitating crucible(s) should be performed in an enclosed environment, as should be the sorting of waste material.

In some embodiments, the production of hydroxy gas may be done in situ as required. In these embodiments, no storage of hydroxy gas is required as the hydroxy gas may be generated and used immediately.

EXAMPLES

Some example measurements and experiments performed with the above described embodiments of the invention will now be described.

MEASUREMENT UNCERTAINTY: +/−2.4% (0.0001%-0.9999% range), +/−2.2% (1.00%-9.99% range), +/−2.1% (10.1%-100% range).

STANDARDISATION: Gas mixtures dynamically blended, fresh air and certified gas mixtures were used as required for calibration.

METHOD OF ANALYSIS: Gas Chromatography—TMGC01.

Example 1—After Life Tires Treatment

| | Concentration (% V/V) | | | |
|---|---|---|---|---|
| Component | Inputs collected: after pyrolysis and combustion of afterlife tyres in crucible | Test 01 of heating tube 01 (carburising flame-more hydrocarbons: yellow) mixed with hydroxy gas | Test 02 of heating tube 01 (balanced/ neutral flame: blue) mixed with hydroxy gas | Test 03 of heating tube 01 (excess hydroxy flame: blue) mixed with hydroxy gas |
| Oxygen | 1.3 | 1.35 | 0.91 | 2.33 |
| Nitrogen (and Argon) | 11.2 | 9.93 | 6.95 | 13.7 |
| Methane | * | <0.0001 | <0.0001 | <0.0001 |
| Carbon Dioxide | 3.7 | 8.39 | 10.3 | 10.4 |
| Ethylene | * | <0.0001 | <0.0001 | <0.0001 |
| Ethane | * | <0.0001 | <0.0001 | <0.0001 |

-continued

| | Concentration (% V/V) | | | |
|---|---|---|---|---|
| Component | Inputs collected: after pyrolysis and combustion of afterlife tyres in crucible | Test 01 of heating tube 01 (carburising flame-more hydrocarbons: yellow) mixed with hydroxy gas | Test 02 of heating tube 01 (balanced/ neutral flame: blue) mixed with hydroxy gas | Test 03 of heating tube 01 (excess hydroxy flame: blue) mixed with hydroxy gas |
| Carbon Monoxide | 4.5 | 13.2 | 10.2 | 7.13 |
| Hydrogen | 10 | 67.1 | 71.6 | 66.5 |
| Propylene | * | <0.0001 | <0.0001 | <0.0001 |
| Propane | * | <0.0001 | <0.0001 | <0.0001 |
| i-Butane | * | <0.0001 | <0.0001 | <0.0001 |
| n-Butane | * | 0.0004 | 0.0004 | 0.0006 |
| n-Pentane | * | <0.0001 | <0.0001 | <0.0001 |
| Methyl fluorenes, | * | ** | ** | ** |
| Tetra-methyl phenanthrenes | * | ** | ** | ** |
| Chrysene | * | ** | ** | ** |
| Benzene | * | ** | ** | ** |
| Toluene | * | ** | ** | ** |
| Xylene | * | ** | ** | ** |
| Xtyrene | * | ** | ** | ** |

A single tungsten heating tube 100 was used for the purpose of combusting and pyrolysing a vaporised oil (produced as a byproduct from the pyrolysation and combustion of an afterlife vehicle tyre) in the presence of oxyhydrogen (HHO), hydroxy gas at temperature up to 3,000 degrees Celsius.

Note (*) these items were not measurable by the approved lab.

Note (**) these tests had no recorded measurements by the approved lab. The lab's written explanation was that the measurements were too small or outside their limitations. The tests 01, 02 and 03 for the inputs and outputs will be repeated for completion in the future. The assumptions given in the written explanation of the lab is that the outputs of these tests, which are hydrocarbons and compounds, is zero.

The above results show that there was a marked increase in hydrogen production across all three measurements, each being considered an acceptable syngas amount for use in the production of methanol when reacted in the presence of carbon monoxide (CO) and carbon dioxide ($CO_2$) via the catalytic compression conversion process. See FIG. 5, item 970. Therefore, if the results of test 01-03 are catalytically compressed they should produce methanol.

The most effective test is test 02 which has a balance/neutral blue flame, a of mix of hydroxy with the flue gases that were produced by 100% chopped tyres.

These are the results of the above tests derived from the report provided from the approved lab on examination of the gas outputs:

Oxygen>1.3% to 0.91%=30% reduction

Nitrogen (and Argon)>11.2% to 6.95%=37.95% reduction

Carbon Dioxide>3.7% to 10.3%=178.38% increase

Carbon Monoxide>4.5% to 10.2%=126.67% increase

Hydrogen>10% to 71.6%=616% increase

HC=*>100% reduction

Example 2—Plastic Bottles/Plastic Polymers

| | Concentration (% V/V) | |
|---|---|---|
| Component | After pyrolysis and combustion in crucible | After pyrolysis and combustion in one heating tube, mixed with hydroxy gas |
| Oxygen | 3.82 | 9.26 |
| Nitrogen (and Argon) | 16.6 | 41.4 |
| Methane | 0.53 | <0.0001 |
| Carbon Dioxide | 63.1 | 29.3 |
| Ethylene | <0.0001 | <0.0001 |
| Ethane | <0.0001 | <0.0001 |
| Carbon Monoxide | 6.90 | 4.40 |
| Hydrogen | 8.00 | 14.6 |
| Helium | * | * |
| Propylene | * | * |
| Propane | * | * |
| i-Butane | * | * |
| n-Butane | * | * |
| n-Pentane | * | * |

A single tungsten heating tube 100 was used for the purpose of pyrolysing and combusting a vaporized polymer oil (produced as a byproduct from the pyrolysis of plastic/polymers obtained from a sample of domestic waste) in the presence of oxyhydrogen (HHO) gas, hydroxy gas up to temperatures of 3,000 degrees Celsius.

These are the results of the above tests derived from the report provided from the approved lab, on examination of the gas outputs:

Oxygen>3.82% to 9.26%=142.41% increase
Nitrogen (and Argon)>16.6% to 41.4%=149.4% increase
Carbon Dioxide>63.1% to 29.3%=53.57% reduction
Carbon Monoxide>6.9% to 4.4%=36.23% reduction
Hydrogen>8% to 14.6%=82.5% increase
Methane>0.53% to 0=100% reduction
HC>100% reduction.

Note (*) indicates that the measurements of this gas were not determined, or were not measurable by the approved lab.

The above results show that there was a marked reduction in carbon dioxide ($CO_2$) from 63.1% down to 29.3% and carbon monoxide (CO) from 6.9% down to 4.4%. This equates to a 53.57% reduction in $CO_2$ and a 36.23% reduction in CO, with a total elimination of all hydrocarbons and toxins.

Example 3—Bottled Carbon Dioxide

| | Concentration (% V/V) | |
|---|---|---|
| Component | Bottled of mainly CO2 composition, | After pyrolysis and combustion by heat tube, mixed with hydroxy gas |
| Oxygen | 2.78 | 1.04 |
| Nitrogen (and Argon) | 18.3 | 13.3 |
| Methane | <0.05 | <0.05 |
| Carbon Dioxide | 78.5 | 61.6 |
| Ethylene | <0.01 | 0.027 |
| Ethane | <0.01 | <0.01 |
| Carbon Monoxide | <0.0005 | 8.41 |
| Hydrogen | 0.379 | 15.6 |
| Helium | <0.005 | <0.005 |
| Propylene | * | * |
| Propane | <0.01 | <0.01 |

-continued

| Component | Concentration (% V/V) | |
|---|---|---|
| | Bottled of mainly $CO_2$ composition, | After pyrolysis and combustion by heat tube, mixed with hydroxy gas |
| i-Butane | * | * |
| n-Butane | <0.05 | <0.05 |
| n-Pentane | * | * |

A single tungsten heating tube 100 was used for the purpose of pyrolysing and combusting bottled carbon dioxide ($CO_2$). From the inputs presented for this test, some air was present. The pyrolysis and combustion of this mixture of gases was done in the presence of oxyhydrogen (HHO), hydroxy gas at temperature up to 3000 degrees Celsius. That is, the hydrocarbons combined with the hydroxy when pyrolysed and combusted can increase the temperatures up to 3000 degrees Celsius in the heating tubes. This process is supported by reference 1 below. In some embodiments, the pyrolysis and combustion at temperatures in the range of 2000 to 3200 degrees Celsius or within subranges thereof.

These are the results of the above tests derived from the report provided from the approved lab, on examination of the gas outputs:
Oxygen>2.78 to 1.04=2.59% reduction
Nitrogen (and Argon)>18.3% to 13.3=27.33% reduction
Carbon Dioxide>78.5 to 61.6%=21.53% reduction
Carbon Monoxide>0 to 8.41%=8.41% increase
Hydrogen>0.379% to 15.6%=4,016.1% increase
HC>100% reduction.

Note (*) indicates that the measurements of this gas were not determined, or were not measurable by the approved lab.

The above results show that there was a marked reduction in $CO_2$ from 78.5% down to 61.6%, which equates to a 21.53% reduction in $CO_2$.

Example 4—Town Gas/Coal

| Component | Concentration (% V/V) | |
|---|---|---|
| | After pyrolysis and combustion, not mixed with hydroxy gas | After combustion and pyrolysis by the heating tube, mixed with hydroxy gas |
| Oxygen | 5.75 | 7.92 |
| Nitrogen (and Argon) | 56.2 | 68.9 |
| Methane | 0.918 | <0.05 |
| Carbon Dioxide | 32.6 | 17.9 |
| Ethylene | 0.082 | <0.01 |
| Ethane | 0.134 | <0.01 |
| Carbon Monoxide | 3.66 | 1.65 |
| Hydrogen | 0.508 | 3.60 |
| Helium | <0.005 | <0.005 |
| Propylene | * | * |
| Propane | 0.088 | <0.01 |
| i-Butane | * | * |
| n-Butane | 0.05 | <0.05 |
| n-Pentane | * | * |

A single tungsten heating tube 100 was used for the purpose of pyrolysing town gas/coal (produced as a byproduct from the pyrolysis and partial combustion of coal within the crucible). The combustion and pyrolysis were done within the heating tube 100 in the presence of oxyhydrogen (HHO), hydroxy gas up to temperatures of 3,000 degrees Celsius.

These are the results of the above tests derived from the report provided from the approved lab, on examination of the gas outputs:
Oxygen>5.75% to 7.92=37.74% increase
Nitrogen (and Argon)>56.2 to 68.9=122.6% increase
Carbon Dioxide>32.6% to 17.9=45.09% reduction
Carbon Monoxide>3.66 to 1.65%=54.92% reduction
Hydrogen>0.508% to 3.6%=608.66% increase
HC>1.272% to 0=100% reduction.

Note (*) indicates that the measurements of this gas were not determined, or were not measurable by the approved lab.

The above results show that there was a marked reduction in carbon dioxide ($CO_2$) from 32.6% down to 17.9% and carbon monoxide (CO) from 3.66% down to 1.65%. This equates to a 45.09% reduction in $CO_2$ and a 54.92% reduction in CO, with a total elimination of all hydrocarbons and toxins.

Example 5—Waste Products/Domestic Waste Products Mix (First)

| Component | Concentration (% V/V)-by volume | | |
|---|---|---|---|
| | Waste product gases from the polariser/crucible, item 50, polarised with minute combustion. | Waste product flue gases polarised and combusted in the presence of hydroxy gas (HHO) after the first heating tube, item 100 | Waste product flue gases polarised and combusted in the presence of hydroxy gas (HHO) after the second heating tube, item 110 |
| Oxygen | 5.78 | 4.56 | 2.76 |
| Nitrogen and Argon* (Inert gases) | 40.8 | 28.2 | 50.8 |
| Nitrous Oxide ** | 2.04-40.8 ** | 1.41-28.2 ** | 2.54-50.8 ** |
| Methane | 10.5 | <0.005 | <0.005 |
| Carbon Dioxide | 14.3 | 12.2 | 11.2 |
| Ethylene | 2.24 | <0.01 | <0.01 |
| Ethane | 5.36 | <0.01 | <0.01 |
| Carbon Monoxide | 2.46 | 8.48 | 2.64 |
| Hydrogen | 13.8 | 45.7 | 32.6 |
| Helium | <0.005 | <0.005 | <0.005 |
| Propylene | * | * | * |
| Propane | 3.15 | 0.585 | <0.01 |
| i-Butane | * | * | * |
| n-Butane | 1.65 | 0.23 | <0.05 |
| n-Pentane | * | * | * |

A first tungsten heating tube 100 was used for the purpose of pyrolysing and combusting a mixture of the following products obtained from a combination of domestic and some industrial waste tyres (20%), general plastics (32%), paper cellulose (34%), food scraps(7%), toxic soup (7%), in the presence of hydroxy gas oxyhydrogen (HHO) gas at a temperature of up to 3000 degrees Celsius. Other toxic products may be included in the waste mix such as toxic soil, PCBs for transformers, PFAS chemicals or any toxic chemical compound because we are breaking the bonding electrons by using high temperature pyrolysation and combustion within the tubes 100, 110 and so forth.

The above results show that there was a marked reduction in carbon dioxide ($CO_2$) from 14.3% down to 12.2% but a marked increase in carbon monoxide (CO) from 2.46% up to 8.48%. This equates to a 14.69% reduction in $CO_2$ and a 244.72% increase in CO, with a significant reduction in the number of hydrocarbons present, from 22.9% down to 0.815%, equating to a 96.44% reduction of all hydrocarbons and toxins.

These are the results of the above tests derived from the report provided from the approved lab, on examination of the gas outputs:

Results after the tube 01:
Oxygen>5.78% to 4.56%=21.11% reduction
Nitrogen (and Argon)>40.8% to 28.2%=30.89% reduction
Carbon Dioxide>14.3% to 12.2%=14.69% reduction
Carbon Monoxide>2.46% to 8.48%=244.72% increase
Hydrogen>13.8% to 45.7=231.16% increase
HC>22.9% to 0.815%=96.44% reduction Note (*) and note (**) explanations, nitrogen, and argon: inert gases, argon plus nitrogen, which is basically inert were measured. Nitrous oxide was not measured and a % range was introduced for completion. The composition of nitrous oxide in the gases will be measured in future experiments and configurations with the use of expensive, high precision, spectrum analysis sensors.

A second tungsten heating tube 110 was then used for the purpose of pyrolysing and combusting the resultant waste product flue gases in the presence of hydroxy gas (HHO) up to 3000 degrees Celsius.

The above results show that there was a further reduction in $CO_2$ from 12.2% down to 11.2% and a subsequent reduction in CO from 8.48% down to 2.64%. This equates to an 8.2% reduction in $CO_2$ and a 68.87% reduction in CO, with a total elimination of all hydrocarbons and toxins.

These are the results of the above tests derived from the report provided from the approved lab, on examination of the gas outputs:

Results after tube02:
Oxygen>4.56% to 2.76%=39.48% reduction
Nitrogen (and Argon)>28.2% to 50.8%=80.14% increase
Carbon Dioxide>12.2% to 11.2%=8.2% reduction
Carbon Monoxide>8.48% to 2.64%=68.87% reduction
Hydrogen>45.7% to 32.6%=23.76% reduction
HC>0.815 to 0=100% reduction The above results show that there was a reasonable increase in hydrogen production, across all three measurements, each being considered an acceptable amount for use in the production of methanol when reacted in the presence of carbon monoxide (CO) and carbon dioxide ($CO_2$) via the catalytic conversion process suggested in system 300, (see item 970 in FIGS. 5A-5E).

Example 6—Waste Products/Domestic Waste Products Mix (Second)

| Component | Concentration (% V/V)-by volume | | |
|---|---|---|---|
| | Waste product gases from the polariser/crucible, item 50, polarised with combustion. | Waste product flue gases polarised and combusted in the presence of hydroxy gas (HHO) after the first heating tube, item 100 | Waste product flue gases polarised and combusted in the presence of hydroxy gas (HHO) after the second heating tube, item 110 |
| Oxygen | 7.49 | 17.8 | 10.2 |
| Nitrogen and Argon (Inert gases) | 73.1 | 80.6 | 88.3 |
| Nitrous Oxide ** | ** | ** | ** |
| Methane | 0.125 | * | * |
| Carbon Dioxide | 17.2 | 1.01 | 1.25 |
| Ethene | 0.036 | * | * |
| Ethane | 0.016 | * | * |
| Carbon Monoxide | 1.65 | 0.0471 | 0.0039 |
| Hydrogen | 3.78 | 0.152 | 0.274 |
| Helium | * | * | * |
| Propylene | * | * | * |
| Propane | * | * | * |
| i-Butane | * | * | * |
| n-Butane | * | * | * |
| n-Pentane | * | * | * |

Note (*) and note (**) explanations, nitrogen, and argon: inert gases, argon plus nitrogen, which is basically inert, were measured. Nitrous oxide was not measured and a % range was introduced for completion. The composition of nitrous oxide in the gases will be measured in future experiments and configurations with the use of expensive, high precision, spectrum analysis sensors.

A first tungsten heating tube 100 was used for the purpose of pyrolysing and combusting a mixture of the following products obtained from a combination of domestic and some industrial waste tyres (20%), general plastics (32%), paper cellulose (34%), food scraps(7%), toxic soup (7%), in the presence of hydroxy gas oxyhydrogen (HHO) gas at a temperature of up to 3000 degrees Celsius. Other toxic products may be included in the waste mix such as toxic soil, PCBs for transformers, PFAS chemicals or any toxic chemical compound because we are breaking the bonding electrons by using high temperature pyrolysation and combustion within the tubes 100, 110 and so forth.

These are the results of the above tests derived from the report provided from the approved lab, on examination of the gas outputs:

Results after the tube 01:
Oxygen>7.49% to 17.8%=137.65 increase
Nitrogen (and Argon)>73.1% to 80.6%=10.26% increase
Carbon Dioxide>17.2% to 1.01%=94.13% reduction
Carbon Monoxide>1.65% to 0.0471%=97.15% reduction
Hydrogen>3.78% to 0.152%=95.98% reduction
HC>0.177% to 0=100% reduction In test 01, the above results show that there was a marked reduction in carbon dioxide ($CO_2$) from 17.2% down to 1.01% and a decrease in carbon monoxide (CO) from 1.65% down to .0.0471%. This equates to a 94.13% reduction in $CO_2$ and a reduction of 97.15% in CO. with a significant reduction in the number of hydrocarbons present, from 0.117% down to zero, equating to a 100% reduction of all hydrocarbons and toxins. For test 01 with the first heating tube 100, there is a reduction of hydrogen from 3.78% down to 0.152% a 95.98% reduction. For test 01 with the first heating tube 100, there is an increase of oxygen from 7.49% to 17.8% a 137.65% increase.

These are the results of the above tests derived from the report provided from the approved lab, on examination of the gas outputs:

Results after the tube 02:
Oxygen>reduction 17.8% to 10.2%=42.7% reduction
Nitrogen (and Argon)>80.6% to 88.3=9.56% increase Carbon Dioxide>1.01% to 1.25%=23.77% increase
Carbon Monoxide>0.0471 to 0.0039=91.72% reduction
Hydrogen>0.152% to 0.274%=80.27% reduction
HC>100% reduction In test 02, the above results show that there was an increase in carbon dioxide ($CO_2$) from 1.01% up to 1.25% and a decrease in carbon monoxide (CO) from 0.0471% down to .0.0039%. This equates to a 23.77% increase in $CO_2$ and a reduction of 91.72% in CO, with a significant reduction in the number of hydrocarbons present, from (*) non measurable (methane, ethene, ethane) as outputs of previous heating tube 100, reduced to zero, equating to a 100% reduction of all hydrocarbons and toxins. For test 02 with the second heating tube 110, there is a reduction of hydrogen from 0.152% down to 0.274%; an 8.27% reduction. For test 02 with the second heating tube 110, there is a decrease of oxygen from 17.8% to 10.2% a 42.7% reduction.

The conclusion given that tests for heating tubes 100-110 for example 05 and example 06 have different outcomes is as follows: the temperatures and the volumes were not calibrated. Tubes 100-110 have not fully eliminated the introduction of air/nitrogen at this point on the apparatus, which is the intention of the inventor.

It is clear that the tests of heating tubes 100-110 for example 05 and example 06 have similar desirable outcomes in the following areas. Both tests indicate significant decrease of the $CO_2$ and HC elimination in these two tests process by the two heating tubes. This is achieved by the treatment of just two heating tubes and it is the intention to be done with an array of 12 heating tubes 100-210 connected in sequence. These outcomes are clearly demonstrated on all tests from example 01-04 utilises one heating tube, examples 05-06 utilises two heating tubes.

There is a clear correlation and a relationship between the directions of $O_2$ vs the directions of: CO, $CO_2$ and $H_2$. That is when CO, $CO_2$ and $H_2$ go up, the $O_2$ goes down and when CO, $CO_2$ and $H_2$ go down, the $O_2$ levels goes up.

It is therefore apparent that the above described apparatus 10, after the treatment of all inputs in the crucible 50-51 and the arrays of heating tubes 100-210/1-15 provides a significant reduction and elimination of HC, and reduction of CO and $CO_2$, to produce methanol or dry ice. The levels of reduction of $H_2$ after the complete treatment by the apparatus 10 will depend on the reduction of CO and $CO_2$. It is predicted that the levels of $O_2$ should increase, the level of $NO_2$ should decrease and the level of $N_2$ (nitrogen) once the whole system is sealed (no air) would be stabilised and decrease.

Component List for Drawings

Apparatus with agitating crucible with one array of heating tubes—10A
Apparatus with agitating crucible with stacked arrays of heating tubes—10B
Entire Housing—20
Circular external base of the housing—15
External wall of the housing—22
Housing cavity—23
Internal wall of the housing—25
Refractory Brick work insulation—for either side, for the top and at the bottom—26
Base of the housing—27
Gap for the rollers within the chamber—35
Argon, cooling inert gas—36
Circular lid—40
Main Heating crucible/agitating container required for pyrolysis and combustion—50, within chamber 55
Second Crucible/agitating container for coal pyrolysis required for cement manufacture—51, within chamber 55
Heating crucible base 52, for either crucibles within chamber 55.
Heating crucible wall 54, for either crucibles within chamber 55.
Chamber/cavity/compartment, a high temperature cavity that contains the crucible, heating tubes, cavities and rollers—55
An overflow reservoir with electrical vaporiser (for oil, hydrocarbons, water, other liquids) that regulates the flow of gases into the mixing chambers 100A-210A—60
Conduit to the reservoir 60—65
Conduit from the reservoir 60 taking gases to the mixing chambers via a gas sensor—66
Condenser to remove steam and carbon particles from the tubes and cool the gases, one per tube fitting—67
Flue gas pump, to move gases from tube to tube at 40 PSA, installed one per tube fitting—68
Conduit from heating chamber—70
High strength shaft—72 that is inside crucible 51
High strength gear box—73—that moves high strength shaft
Stirring rods of conduit tube—75
Magnetic drive mechanism 80
First magnetic plate round inside the housing cavity 23—86
Second magnetic round plate inside the housing cavity 23 below refractory bricks 26—87
High temperature shaft inside housing cavity 23 that connects the two magnetic palates with each other—89
Side rollers 90-95, six rollers on each of the three levels 1-3. An array of six rollers for each meter. (A configuration of one array of 6 rollers for five arrays of heating tubes each array of tubes has 12 tubes.
Bottom rollers for the crucible 90A-95A—six bottom crucible rollers may be required.
Bottom rollers for the magnetic plate 90B-92B—three bottom magnate plate rollers may be required.
Reverse osmosis water module—1550
Customised electric power supply to drive the system and all its components—1560
Heating pyrolysis and combustion tubes: estimated 12 tubes per row with up to 15 rows or more—100-210.
Mixing chamber enclosure: estimated 12 mixing chambers per row and up to 15 rows or more—100A-210A
Mixing cavity: (within each mixing chamber enclosure) estimated 12 mixing cavity per row and up to 15 rows or more—100B, 210B. Within the mixing cavity enclosure, hydroxy gas is mixed with other hydrocarbon gases which produced in the previous processes within crucible 50.
Entire system—300A-300F
Heat exchanger—220
Turbine—230
Electricity grid—240
Electronic ignition device (a high temperature spark plug made up with tungsten and zirconia)—600
A magazine mechanism with multiple clean sparks plugs that automatically replaces an existing spark plug—610
Injector (removable injector nozzles which inject the gasses into the tungsten reaction tubes)—700

A magazine mechanism with multiple clean injectors that automatically replaces an existing injector—710

PLC ultrasonic flow meter and control—800

Electrostatic separation of carbon from ash and other materials—900

Cryogenic and/or molecular sieve separation separator—950

Heat/cool exchanger for hot flue gases and cold H2, CO and CO2—60

Conversion to electricity or conversion to methanol of gasses—970

Cyclone separation system of flue gases from particles—such as carbon, ash, cement particles—1000

Air cooled heat exchanger condenser and reservoir for removal of heat and water from flue gases—1100

A flue gases pump, extracting from the condenser and pumping the flue gases into the cyclone—1150

Argon and leaked flue gases density separation scraper—1200

Enclosed re-filling environment for the agitating crucible(s)—1300

Separation and shredding of waste—1350

Crashing and preparation of coal—1360

Calcium carbonate, silica and coal supply—1365

Sewerage sludge and coal supply—1366

Contaminated soil and toxic waste supply—1367

Coal power station blast furnace—1370

Natural gas supply—380

PLC computer integrated monitoring and control systems with Al.—1400 and producing the hydroxy gas which is oxygen and hydrogen together (gas supply device)—1500

Reverse osmosis (RO) water processing—1550

Yellow: "optical sensors" to monitor and control temperatures of output gases 24×7—1600

Orange: "Ultrasound flow control sensors" to monitors and controls the flow rates of input gases 24×7—1610

Blue: "spectrum analysis sensors" to monitors and control output gases such us HC, $CO_2$, CO, $O_2$, $N_2O$, $N_2$, $H_2$, $H_2O$ (steam), Carbon particles 24×7—1620

PLC design; system monitory sensor actions, programming routines, workaround procedures—1700-1799

PLC panel design rules, decision table, bases on all system sensor input provided online real time from all equipment—rules: 8000-8999

CONCLUSIONS

In essence, the apparatus 10, system 300 and method as described above presents a unique and environmentally safe means by which to dispose of hydrocarbon based waste materials that may otherwise simply pollute the atmosphere and groundwater during their disposal via conventional methods.

The apparatus 10, system 300 and method as described above also present a unique and environmentally safe means by which coal can be processed, via pyrolysis and combustion, in a coal fire power station and coal with silica with calcium carbonate, for manufacture of cement.

This apparatus 10 and system 300 could prove invaluable to industry, particularly the energy industry, whereby the need for chimney stacks to ventilate highly toxic flue gases into the upper atmosphere becomes a thing of the past.

Similarly, the high calorific value associated with the pyrolysis and combustion of hydrocarbon based waste materials or coal may be exploited by converting them to electrical energy that will be utilised by the apparatus 10, while the remainder may be sold back to the grid 240.

With some straightforward system design amendments to the overall apparatus 10, the presently described configurations can be adopted for processing a wide range of waste products, including coal fire power stations (coke), cement manufacture, gas fire power stations, sewerage treatment, contaminated soil and toxic waste and all engineering systems that serve the industrial heat industry that may require high temperatures or crucible(s) or just heating tubes, without a crucible. Adjustments to the electronics can be made to the PLC computer integrated monitoring and control system to accommodate the various inputs for each system application of the apparatus of polarisation and combustion.

Definitions

Whenever a range is given in the specification, for example, a temperature range, a time range, or concentration range, flow rate range for inputs and outputs, all intermediate ranges and subranges, as well as all individual values included in the ranges given are intended to be included in the disclosure. It will be understood that any subranges or individual values in a range or subrange that are included in the description herein can be excluded from the claims herein.

All definitions, as defined and used herein, should be understood to control over dictionary definitions, definitions in documents incorporated by reference, and/or ordinary meanings of the defined terms.

Throughout this application, the term "about" is used to indicate that a value includes the inherent variation of error for the device, the method being employed to determine the value, or the variation that exists among the study subjects.

The indefinite articles "a" and "an," as used herein in the specification, unless clearly indicated to the contrary, should be understood to mean "at least one."

The phrase "and/or," as used herein in the specification, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Spatially relative terms, such as "internal," "outer," "beneath," "below," "lower," "above," "upper," and the like, may be used herein for ease of description to describe one element or feature's relationship to another element(s) or feature(s) as illustrated in the Figures. Spatially relative terms may be intended to encompass different orientations of the device in use or operation in addition to the orientation depicted in the Figures.

While the invention has been described in conjunction with a limited number of embodiments, it will be appreciated by those skilled in the art that many alternatives, modifications, and variations in light of the foregoing description are possible. Accordingly, the present invention is intended to embrace all such alternatives, modifications and variations as may fall within the spirit and scope of the invention as disclosed.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereof.

The present application may be used as a basis or priority in respect of one or more future applications and the claims of any such future application may be directed to any one feature or combination of features that are described in the present application. Any such future application may include one or more of the following claims, which are given by way of example and are non-limiting in regard to what may be claimed in any future application.

References:
1. Eckman, Chris. (2010). Plasma Orbital Expansion of the Electrons in Water. *Proc. NPA*. 7.
2. Atomistry.com Chemistry—Thermal Decompositions of $CO_2$, accessed from http://carbon.atomistry.com/decomp%20%20%20%20%20%20%20%20%20%20%20bsition_carbon_dioxide.html as at 24 Jun. 2020.
3. Thermal Decomposition of CO—NIST Standard Reference Database 69: NIST Chemistry WebBook, accessed from https://webbook.nist.gov/cgi/cbook.cgi?ID=C630080&Type=JANAFG&Table=on, as at 24 Jun. 2020.
4. Carbon Dioxide Emission Factors for Coal by B. D. Hong and E. R. Slatick—January-April 1994, DOE/EIA-0121(94/Q1) (Washington, DC, August 1994), pp. 1-8, accessed from https://www.eia.gov/coal/production/quarterly/co2_article/co2.html, as at 24 Jun. 2020.

The claims defining the invention are as follows:

1. An apparatus for pyrolysing and combusting a material, the apparatus comprising:
   one or more crucibles for receiving a material to be pyrolysed and combusted therein; and
   one or more heating tubes disposed around the crucible(s), wherein the or each heating tube is configured for:
     receiving byproduct(s) produced during pyrolysis and combustion of the material within the crucible(s);
     receiving an electrolysis gas comprising a mix of hydrogen and oxygen and mixing the electrolysis gas with the byproduct(s); and
     pyrolising and combusting the mixture of the byproduct(s) and the electrolysis gas to produce processed gas from the byproduct(s).

2. The apparatus according to claim 1, further comprising an ignition device that is electrically connected to the or each heating tube to ignite the gas when present within said heating tube.

3. The apparatus according to claim 2 wherein the ignition device includes:
   a plurality of spark plugs to ignite the electrolysis gas within the or each heating tube; and
   a mechanised delivery system for delivering replacement spark plugs when a carbon build up occurs.

4. The apparatus according to claim 1, wherein the or each heating tube is adapted to generate and/or support temperatures across the range of 0 degrees Celsius to 3,000 degrees Celsius during pyrolysis and combustion of the byproduct(s).

5. The apparatus according to claim 1, further comprising a housing with an opening configured to receive and mount the crucible(s) there within and wherein the or each heating tube is mounted within a housing cavity of the housing.

6. The apparatus according to claim 5, further comprising:
   a lid, that is configured to sealingly engage the opening to enclose the chamber, substantially within the housing; and
   a conduit that extends substantially through the lid and the opening of the housing to facilitate fluid communication of the one or more byproduct(s) from the crucible to the one or more heating tubes.

7. The apparatus according to claim 6 wherein the high strength conduit comprises one or more holes to allow gases to escape upwards.

8. The apparatus according to claim 5, further comprising an overflow reservoir in communication with the conduit to regulate a flow of flue gases from the crucible(s).

9. The apparatus according to claim 5, further comprising an agitating mechanism configured to agitate the crucible(s).

10. The apparatus according to claim 9 wherein the agitating mechanism includes a magnetic drive mechanism located within the housing.

11. The apparatus according to claim 1, wherein the or each heating tube is manufactured from tungsten, ceramic tungsten alloy, tungsten-molybdenum alloy, or a graphite tungsten aluminum alloy.

12. The apparatus according to claim 1, wherein the material to be pyrolysed and combusted comprises hydrocarbon containing material and wherein the byproduct(s) produced via pyrolysis and combustion of the hydrocarbon containing material within the crucible(s), is selected from the group consisting of vaporised hydrocarbon(s), water. carbon char, hydrogen, carbon monoxide, carbon dioxide, oxygen, nitrogen, nitrous oxide, ash, and any mixture thereof.

13. A system The apparatus according to claim 1, further including a gas supply device operably connected to the or each heating tube for supplying an electrolysis gas comprising a mix of hydrogen and oxygen to the or each heating tube for use in pyrolysing and combusting the byproduct(s) within said heating tube(s) and wherein the gas supply device comprises an electrolysis system for electrolytically generating the electrolysis gas.

14. The apparatus according to claim 1, further comprising one or more air cooled heat exchangers configured to receive processed gas from one or more of the heating tubes.

15. The apparatus according to claim 14, further comprising one or more gas pumps for receiving gas from the one or more air cooled heat exchangers.

16. The apparatus according to claim 15, further comprising one or more cyclonic separators configured to receive gas from the one or more gas pumps to separate particles from the processed gas.

17. A system The apparatus according to claim 1 comprising a density separation scraper module to perform a density separation process on processed gasses with the housing.

18. The apparatus according to claim 1, wherein, during the pyrolysis and combustion in the one or more heating tubes, an amount of hydrogen, $CO_2$ and CO is reduced, and an amount of $N_2O$ and $O_2$ is increased.

19. A method of pyrolysing and combusting a material, comprising:
   pyrolysing and combusting material received within one or more crucibles using heat generated within one or more heating tubes located around a chamber which contains the crucible(s);

receiving byproduct(s) produced during the combustion and pyrolysis of the material within the or each heating tube;
receiving an electrolysis gas comprising a mix of hydrogen and oxygen within the or each heating tube; and
pyrolysing and combusting the mixture of the byproduct(s) and electrolysis gas within the or each heating tube to produce a processed gas.

* * * * *